United States Patent
Hamada et al.

(10) Patent No.: US 8,102,941 B2
(45) Date of Patent: Jan. 24, 2012

(54) PEAK SUPPRESSION CONTROL APPARATUS

(75) Inventors: Hajime Hamada, Kawasaki (JP);
Tokuro Kubo, Kawasaki (JP); Kazuo Nagatani, Kawasaki (JP); Hiroyoshi Ishikawa, Kawasaki (JP); Nobukazu Fudaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1230 days.

(21) Appl. No.: 11/822,946

(22) Filed: Jul. 11, 2007

(65) Prior Publication Data

US 2008/0013646 A1    Jan. 17, 2008

(30) Foreign Application Priority Data

Jul. 12, 2006    (JP) .................... 2006-191629

(51) Int. Cl.
   *H04L 25/03*    (2006.01)
   *H04L 25/49*    (2006.01)
   *H04K 1/02*    (2006.01)
(52) U.S. Cl. ........................................ 375/297
(58) Field of Classification Search ............ 375/297
   See application file for complete search history.

(56) References Cited

U.S. PATENT DOCUMENTS

| | | | |
|---|---|---|---|
| 7,652,981 B2 | 1/2010 | Tomisato et al. | |
| 2003/0092405 A1 | 5/2003 | Groe et al. | |
| 2006/0008015 A1* | 1/2006 | Marsili | 375/260 |
| 2006/0067426 A1* | 3/2006 | Maltsev et al. | 375/297 |
| 2007/0021091 A1* | 1/2007 | Trankle | 455/337 |
| 2007/0047431 A1 | 3/2007 | Nishio et al. | |
| 2007/0188218 A1* | 8/2007 | Ueda | 327/551 |

FOREIGN PATENT DOCUMENTS

| | | |
|---|---|---|
| EP | 1164694 A | 12/2001 |
| GB | 2356095 A | 5/2001 |
| JP | 2002-217828 | 8/2002 |
| JP | 2005-269550 A | 9/2005 |
| JP | 2009-535924 | 10/2009 |
| WO | WO 02/084865 A | 10/2002 |
| WO | WO-2004/051900 | 6/2004 |
| WO | WO-2005/055479 | 6/2005 |
| WO | WO-2006/012306 | 2/2006 |
| WO | WO-2006/031156 | 3/2006 |
| WO | WO-2007/127782 | 11/2007 |

OTHER PUBLICATIONS

"Japanese Office Action", mailed by JPO and corresponding to Japanese application No. 2006-191629 on Jun. 7, 2011, with partial English translation.

* cited by examiner

*Primary Examiner* — David C. Payne
*Assistant Examiner* — Tanmay Shah
(74) *Attorney, Agent, or Firm* — Fujitsu Patent Center

(57) ABSTRACT

A peak suppression threshold value control unit receives an input of quality requirement information, such as a modulation system and coding ratio, from a baseband signal generation unit, determines a threshold value of a peak suppression unit based on the quality requirement information and outputs the threshold value to a peak suppression unit. The peak suppression unit applies a peak suppression control to a baseband signal input from a baseband signal generation unit based on the threshold value and outputs a signal (i.e., a peak suppression signal) applied by the peak suppression process.

29 Claims, 31 Drawing Sheets

1170

| MODULATION METHOD | CODING RATIO | EVM [%] |
|---|---|---|
| QPSK | 1/2 | 17.78 |
| QPSK | 3/4 | 12.59 |
| 16QAM | 1/2 | 9.44 |
| 16QAM | 3/4 | 6.31 |
| 64QAM | 1/2 | 5.01 |
| 64QAM | 2/3 | 3.98 |
| 64QAM | 3/4 | 3.16 |

PRIOR ART

FIG. 7

FIG. 12A BPSK
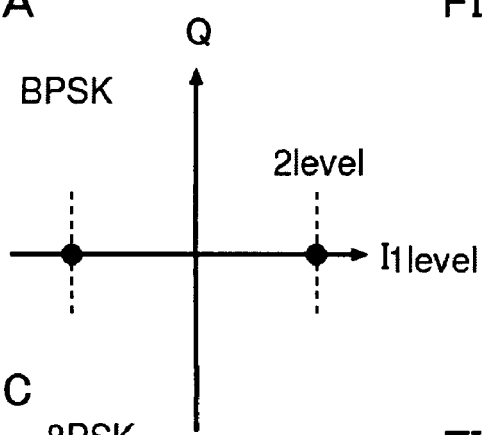
FIG. 12B QPSK
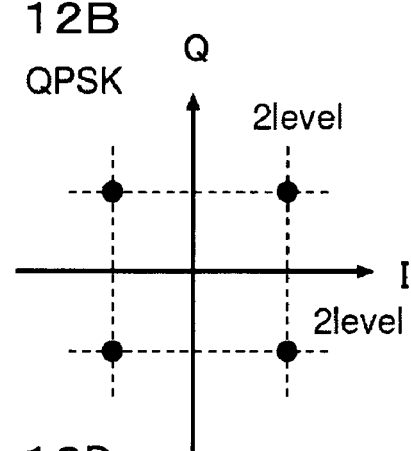
FIG. 12C 8PSK
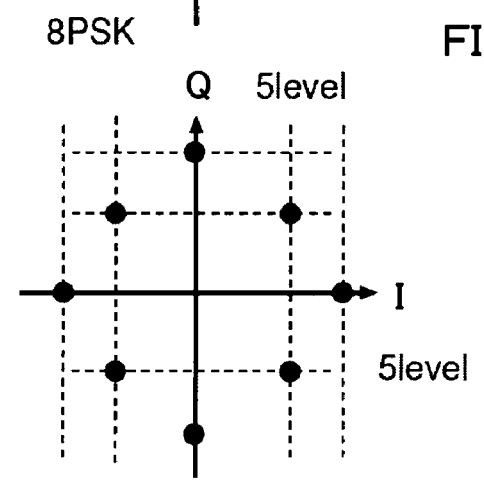
FIG. 12D 16QAM
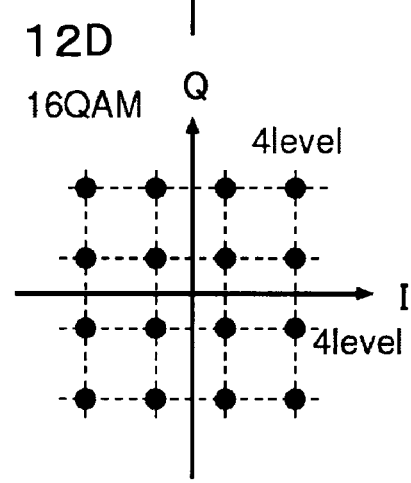

41

| Ni | Nq | MODULATION METHOD |
|---|---|---|
| 2 | 1 | BPSK |
| 2 | 2 | QPSK |
| 5 | 5 | 8PSK |
| 4 | 4 | 16QAM |

F I G. 1 4

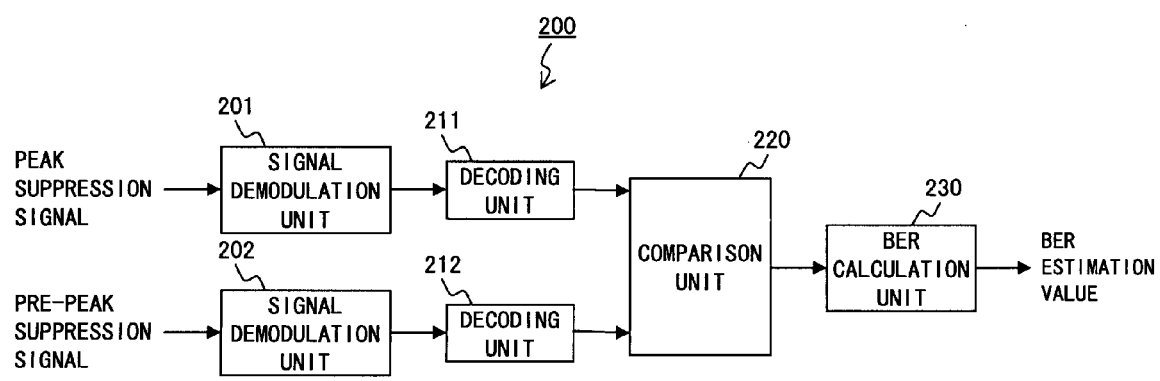
F I G. 20

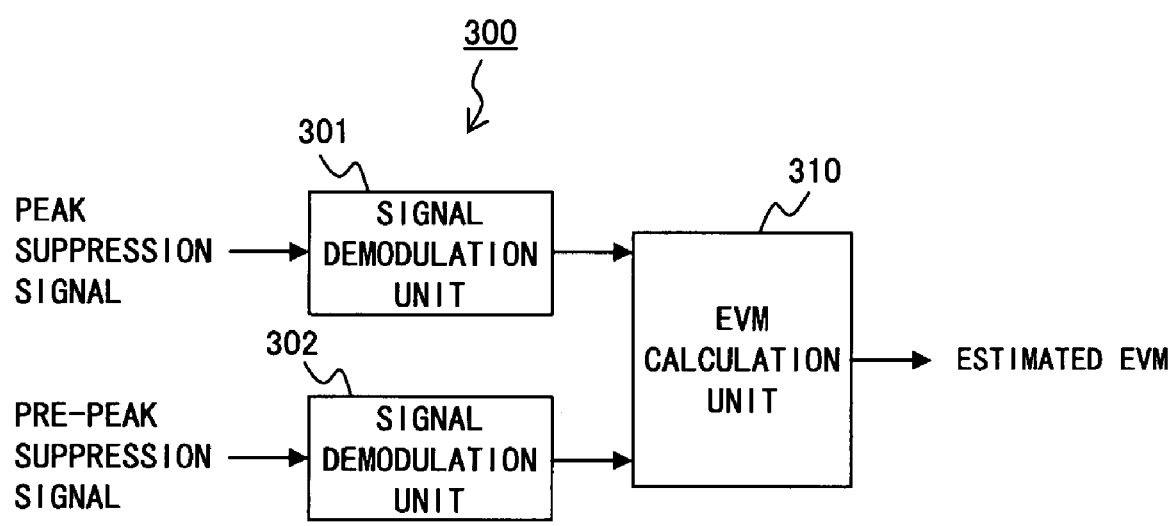
F I G. 2 1

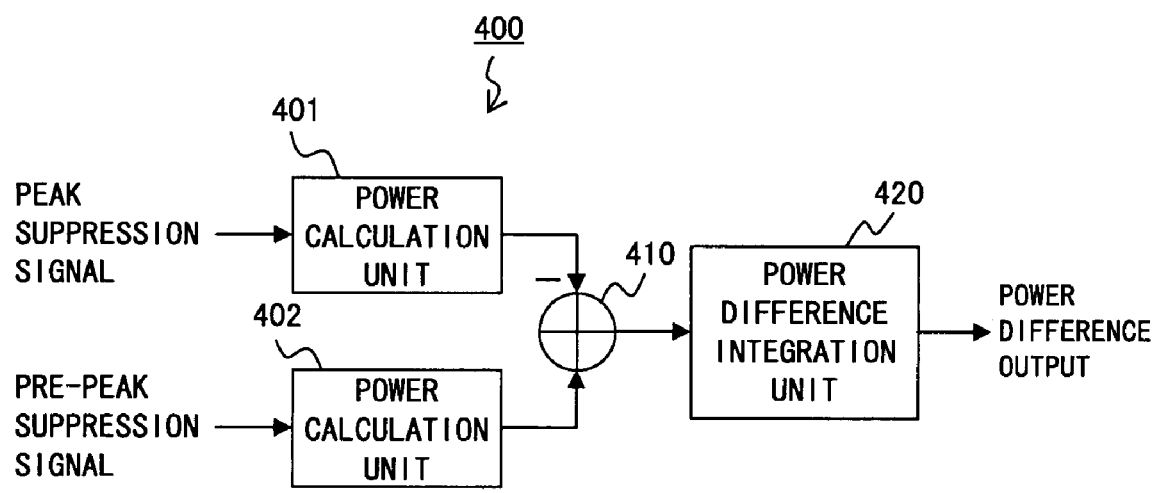
F I G. 2 2

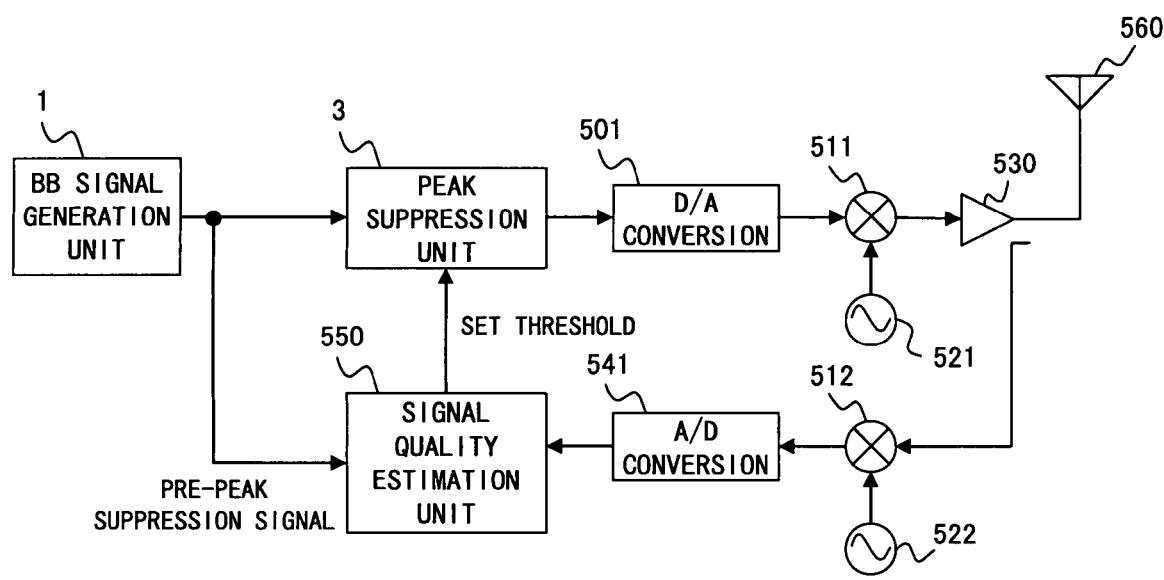
F I G. 23

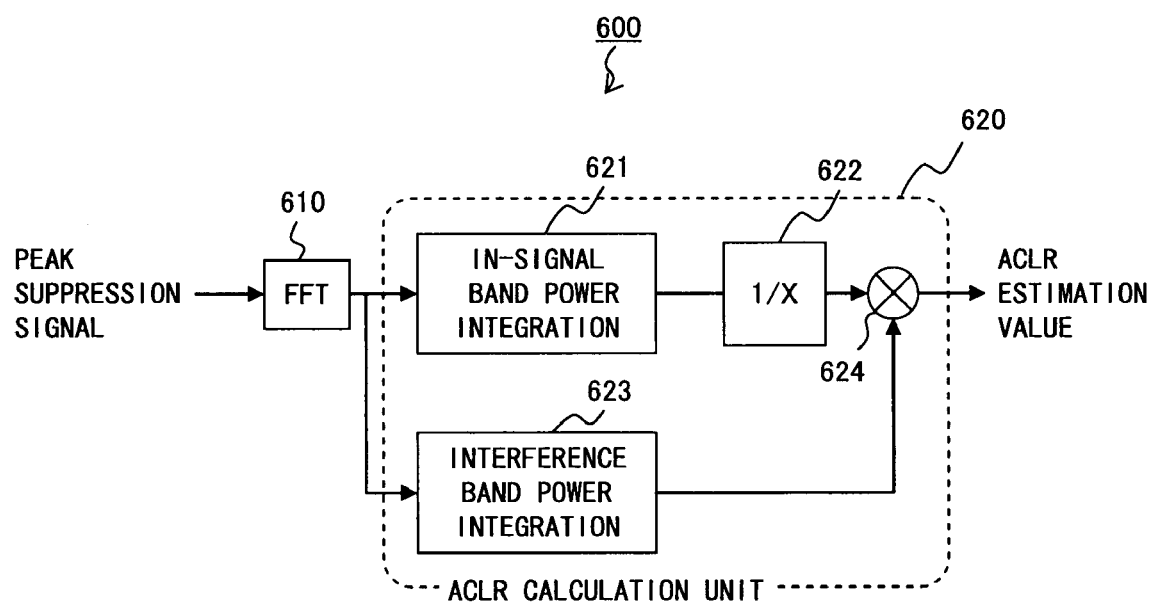
F I G. 26

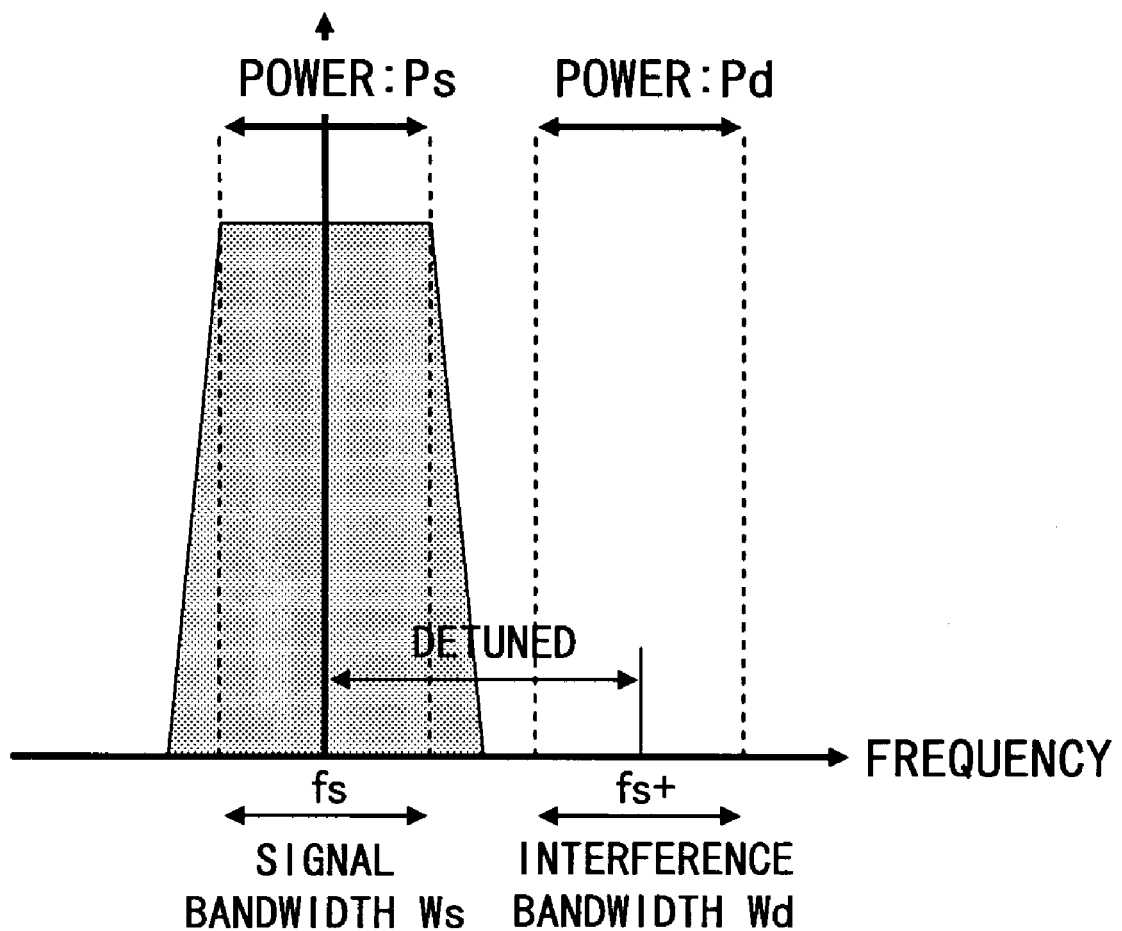
F I G. 2 7

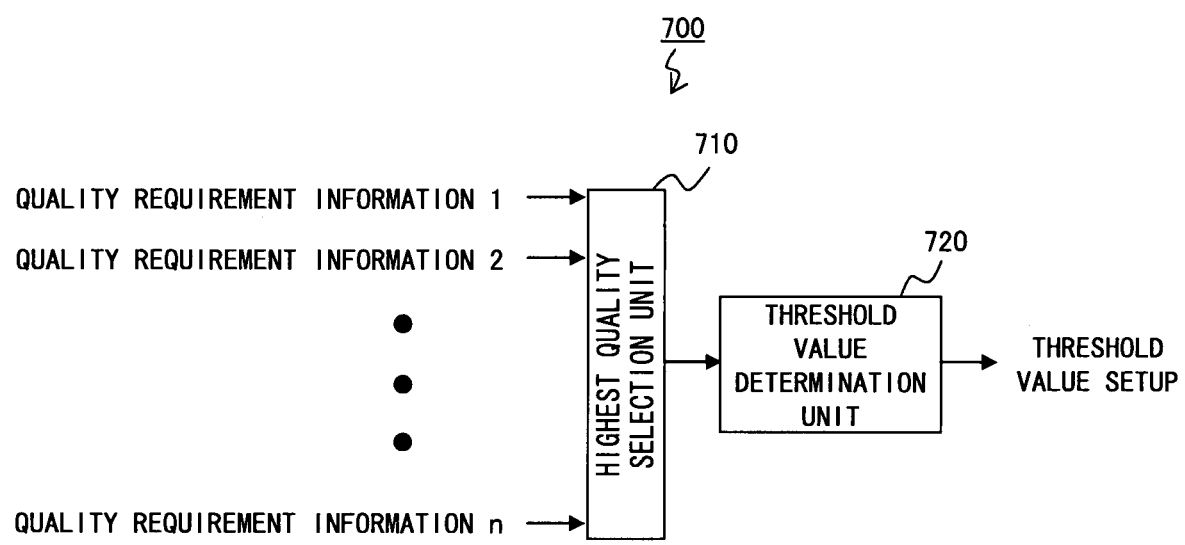
F I G. 2 8

711

| Q(n) | MODULATION METHOD | CODING RATIO |
|---|---|---|
| 1 | QPSK | 1/2 |
| 2 | QPSK | 3/4 |
| 3 | 16QAM | 1/2 |
| 4 | 16QAM | 3/4 |
| 5 | 64QAM | 1/2 |
| 6 | 64QAM | 2/3 |
| 7 | 64QAM | 3/4 |

FIG. 29

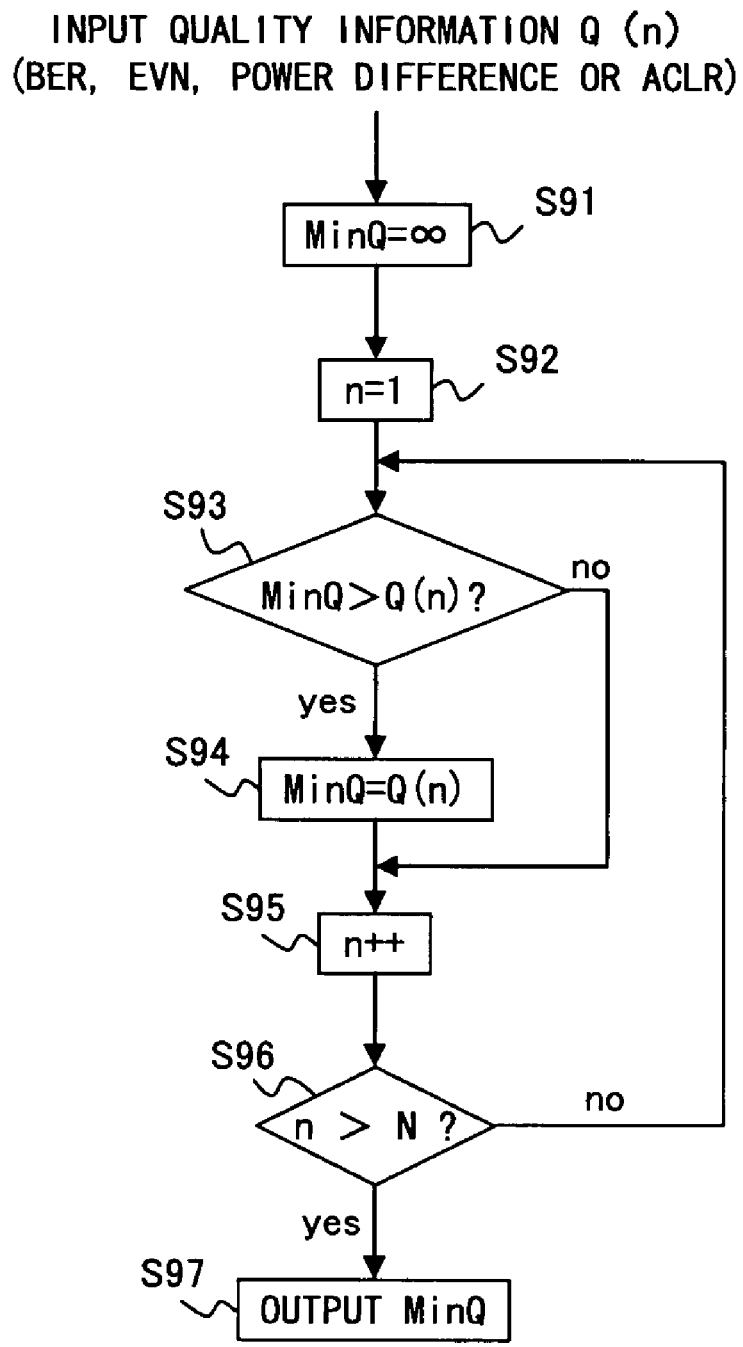
F I G. 31

PEAK SUPPRESSION CONTROL APPARATUS

BACKGROUND OF THE INVENTION

1. Field of the Invention

The present invention relates to a transmission amplifier and in particular to an apparatus controlling a degree of peak suppression at a peak suppression unit for suppressing a peak power of an input signal of the transmission amplifier.

2. Description of the Related Art

The next generation mobile communication is premised on an adoption of the Orthogonal Frequency Division Multiplexing (OFDM) and Multiple Input Multiple Output (MIMO). When adopting these, a power consumption of a radio frequency (RF) circuit must be reduced. The RF circuit is constituted by electronic components such as an antenna, power amplifier, RF filter, and AD converter. Among these electronic components, a reduction of power consumption of a power amplifier (named as "transmission amplifier" hereinafter) is especially important.

A linear amplification is required of a transmission amplifier for use in a digital radio communication system. A signal with a large peak-to-average power ratio (PAPR) usually requires a high linearity.

FIG. 1 is a diagram showing a relationship of an input/output characteristic of a transmission amplifier with a peak of a signal. In FIG. 1, the horizontal axis is an input power of a transmission amplifier, and the vertical axis is an output power thereof.

As shown by a characteristic curve 1001 in FIG. 1, the relationship between the input power and output power changes from linear to nonlinear with an increase of the input power, with the amplifier gain gradually becoming saturated.

As shown on a lower side of FIG. 1, for a signal with a large PAPR (i.e., a signal with an average power at an operation point 1 indicated in the diagram), the transmission amplifier needs to be operated in a linear zone by allowing a large back-off power of the transmission amplifier, resulting in a large reduction in a power added efficiency (PAE). Contrarily, for a signal with a small PAPR (i.e., a signal with an average power at an operation point 2 indicated in the diagram), the transmission amplifier can be operated in high efficiency because a back-off power can be small. Note that the operation points 1 and 2 are average powers of a signal with a large PAPR and that with a small PAPR, respectively. The peak power is the maximum amplitude (i.e., the maximum input power) of each waveform. Here, the back-off power is defined as the difference between the peak power and average input power.

As a method for preventing a reduction of efficiency of a transmission amplifier for inputting and amplifying a signal with a large PAPR as described above, among proposed for example is a peak suppression method of a circuit configuration as shown in FIG. 2. The peak suppression method is configured to equip a peak suppression unit 1120 in front of a digital-to-analog (D/A) conversion unit 1130 so that the peak suppression unit 1120 suppresses a peak component of a signal output from a digital signal generation unit 1110. A peak suppression signal as a result of the peak suppression unit 1120 suppressing the peak component is converted into an analog signal by the D/A conversion unit 1130, followed by being multiplied, at a mixer 1150, by a carrier wave output from a local oscillator 1140. The modulation signal generated by the mixer 1150 is amplified by a transmission amplifier 1160, and then emitted as a radio wave from an antenna 1170.

FIGS. 3 and 4 respectively exemplify conventional circuit configuration of the peak suppression unit 1120, with FIG. 3 showing a method employing a clip, FIG. 4 showing a method employing a window function.

The peak suppression circuit of the clip method shown by FIG. 3 comprises a delay (i.e., Delay) unit 1121, an amplitude arithmetic operation unit 1122, a peak detection unit 1123, a threshold/amplitude unit 1124 and a multiplier 1125. Briefly describing the operation of the circuit, a transmission signal S(t) is input to the delay unit 1121 and amplitude arithmetic operation unit 1122. The amplitude arithmetic operation unit 1122 calculates an amplitude |S(t)| of the transmission signal S(t) and outputs it to the peak detection unit 1123 and threshold value/amplitude unit 1124. The peak detection unit 1123, having detected a peak (peak value) of the amplitude |S(t)| of the transmission signal S(t), notifies the threshold/amplitude unit 1124 of the fact.

The threshold value/amplitude unit 1124, having been input the notification signal from the peak detection unit 1123, compares the amplitude |S(t)| input from the threshold value/amplitude unit 1124 with a threshold value Vth and performs an arithmetic operation of the following expressions (1) or (2) in accordance with the comparison result, followed by suppressing the peak (i.e., the maximum amplitude) of the transmission signal S(t) to no more than the threshold value Vth:

$$S'(t)=S(t); \text{ if } |S(t)| \leq Vth \quad (1)$$

$$S'(t)=Vth/|S(t)|*S(t); \text{ if } |S(t)|>Vth \quad (2)$$

The transmission signal S(t) delayed by the delay unit 1121 and the amplitude |S(t)| output from the threshold value/amplitude unit 1124 is multiplied by the multiplier 1125 and the resultant is output as a peak suppression signal.

The peak suppression circuit of the window function method shown by FIG. 4 is configured to equip a window function generation unit 1127 in place of the threshold/amplitude unit 1124, otherwise the same configuration as the peak suppression circuit of the clip method shown by FIG. 3. The same component sign is assigned to the same constituent component as one shown in FIG. 3.

The window function generation unit 1127 generates a window function (e.g., hanning window, hamming window, Kaiser window, Blackman window or such) used for a fast Fourier transform (FFT) or making a finite impulse response (FIR) filter and outputs the generated window function to the multiplier 1125. The multiplier 1125 multiplies the transmission signal S(t) that is input by way of the delay unit 1121 by the window function input from the window function generation unit 1127 and outputs the transmission signal S(t) by converting it so as to make the amplitude |S(t)| equal to or less than the threshold value Vth.

FIG. 5 shows an original transmission signal, an output signal of a peak suppression circuit of the clip method (noted as "clip method" for convenience hereinafter) and that of a peak suppression circuit of the window function method (noted as "window function method" for convenience hereinafter). Referring to FIG. 5, the solid line curve 1151 is the original transmission signal S(t), and the dashed line curve 1153 on the upper side of the drawing is a transmission signal output from the window function method peak suppression circuit. And the dashed line curve 1155 on the lower side of the drawing is the window function (i.e., a suppressed window function). Here, a=Vth/|S(t)|. As shown in FIG. 5, the suppressed window function is so set that its value varies within "a" to "1". In the case of the clip method, the amplitude components exceeding the threshold Vth of the original transmission signal S(t) are clipped so as to make the threshold value Vth. In the case of the window function, the original transmission signal S(t) is converted so that the amplitude does not exceed the threshold value Vth.

FIG. 6 shows spectra when applying a clip method and a window function method to an original transmission signal S(t). Referring to FIG. 6, the horizontal axis is frequency and the vertical axis is power (unit: decibel (dB)). The solid line curve 1161 is the spectrum of the original transmission signal S(t), the dotted line curve 1162 is the spectrum of a transmission signal S(t) applied by the clip method and the chain line curve 1163 is that of a transmission signal S(t) applied by the window function method.

In the clip method, only a least necessary transmission signal S(t) is suppressed, reducing the cutoff signal and hence limiting a degradation of a reception characteristic. On the other hand, generating a high frequency component because the edge of suppression is not smooth, hence resulting in degrading greatly the spectrum characteristic as shown in FIG. 6.

In the window function method, a degradation of the spectrum characteristic is smaller compared to the clip method because the edge of suppression can be relatively smooth. In order to limit a degradation of the spectrum characteristic, however, a window function with a long temporal width to some extent must be multiplied to the original transmission signal S(t) and therefore an amount of signal as that much is cut off, enlarging a degradation of the reception characteristic.

Incidentally, though the relationship with the present invention is low, there is a known technique for controlling an average power of a signal input to a transmission amplifier as a technique related to a transmission amplifier (refer to a reference patent document 1).

Patent document 1: Japan Patent Application Laid-Open Publication No. 2002-217828

The above described two methods have characteristics of enabling an implementation by a simple digital signal processing on a transmission side and eliminating a necessity of a specific reproduction process at a reception side. A degradation of a signal quality (i.e., reception quality and spectrum), however, needs to be allowed to some extent because a signal is cut off. That is, the clip method is capable of reducing a degradation of a reception quality, allowing an increase in degradation of a spectrum characteristic. The window function method is capable of reducing a degradation of spectrum characteristic than the clip method, allowing an increased degradation of a reception characteristic.

How much degradation shall be allowed is determined by a requirement of each system or a signal to be transmitted. As an example, the IEEE802.16e (WiMax) Standard has adopted an Adaptive Modulation Coding (AMC) that changes a modulation system and a coding ratio dynamically in accordance with a desired signal quality, with an Error Vector Magnitude (EVM) expressing a distortion of a signal at the time of reception being specified as shown by the table in FIG. 7.

Each row of the table 1170 shown in FIG. 7 consists of three items, i.e., "modulation system", "coding ratio" and "(permissible) EVM (%)".

In cases where defining an information bit as x bit and a transmission bit obtained by a coding as y bit, the coding ratio is expressed by:

Coding ratio=$x/y$,

The table 1170 of FIG. 7 comprehensibly shows that the value of permissible EVM differs greatly depending on modulation system and/or coding ratio. The conventional peak suppression method needs to determine a degree of peak suppression fixedly. Applying a peak suppression of the same degree of suppression to all of various signals as described above and transmitting them with the same back-off, the only possible way is to apply a peak suppression matching with a signal of the strictest standard. This consequently forces a transmission amplifier to operate at a low operating point even where there is no necessity to demand high quality. This in turn requires the transmission amplifier to suppress a transmission power if the same amplifier is to be used; or a bulky, expensive, and large-gain transmission amplifier if it is to be operated at a specified power.

SUMMARY OF THE INVENTION

The purpose of the present invention is to suppress a peak power of a transmission signal to be input to a transmission amplifier so that the transmission amplifier, while operating in high efficiency, is able to amplify and output the transmission signal satisfying the required quality.

The present invention premises on a peak suppression control apparatus controlling a degree of peak suppression of a peak suppression unit for suppressing a peak power of an input signal of a transmission amplifier.

A first aspect of the present invention is characterized as comprising a peak suppression degree control unit for changing a degree of peak suppression of the peak suppression unit based on the quality requirement information of a transmission signal suppressed by the peak suppression unit.

The first aspect of the present invention is configured to change a degree of peak suppression of a transmission signal in accordance with a required quality of the transmission signal applied by peak suppression, thereby making it possible to operate a transmission amplifier in high efficiency while satisfying the quality of the signal of a result of applying the peak suppression to the transmission signal.

A second aspect of the present invention is characterized as the first aspect being such that the quality requirement information is notified from a unit generating said transmission signal.

The second aspect of the present invention is capable of accomplishing the function and effect of the first aspect by utilizing the information notified from the unit generating the transmission signal.

A third aspect of the present invention, according to the first or second aspect, is configured such that the peak suppression degree control unit comprises a storage unit for registering said quality requirement information and its corresponding degree of peak suppression, and a peak suppression degree determination unit for obtaining a degree of peak suppression corresponding to quality requirement information by searching in said storage unit based on the quality requirement information and determining the degree of peak suppression as that of said peak suppression unit.

The third aspect of the present invention makes it possible to obtain, in high speed, an appropriate degree of peak suppression necessary for accomplishing the function and effect of the first or second aspect by searching in the storage unit.

A fourth aspect of the present invention according to the first aspect is characterized as comprising a quality information estimation unit for estimating said required quality from a transmission signal suppressed by said peak suppression unit and determining said degree of peak suppression based on the estimated required quality.

The fourth aspect of the present invention is capable of determining the degree of peak suppression based only on the transmission signal, thereby enabling an accomplishment of the function and effect of the first aspect by a small-scale circuit.

A fifth aspect of the present invention comprises a signal quality estimation unit for estimating a signal quality of a peak suppression signal based on a transmission signal suppressed by the peak suppression unit and a peak suppression signal as a result of the peak suppression unit applying a peak suppression process to the transmission signal, and determining a degree of peak suppression to be set in the peak suppression unit so as to make the signal quality equal to or better than a predetermined quality.

The fifth aspect of the present invention is contrived to estimate a signal quality of a peak suppression signal based on a pre-peak suppressed transmission signal and a signal (i.e., a peak suppression signal) as a result of applying peak suppression to a transmission signal, thereby making it possible to accomplish the function and effect of the first aspect while setting a degree of peak suppression appropriately.

A sixth aspect of the present invention, according to the first aspect, comprises a signal quality estimation unit for estimating a signal quality of a signal output from said transmission amplifier based on said transmission signal and a signal of a result of modulating a carrier modulation signal of said peak suppression signal output from the transmission amplifier.

The sixth aspect of the present invention is contrived to estimate quality of a signal output from the transmission amplifier based on a pre-peak suppressed transmission signal and a signal that is a result of demodulating an output signal of the transmission amplifier that is the peak suppression signal amplified thereby, and therefore the signal quality can be estimated more accurately. This in turn makes it possible to set the degree of peak suppression more appropriately when accomplishing the function and effect of the first aspect.

A seventh aspect of the present invention, according to the sixth aspect, further comprises an output stop unit for stopping an external output of said peak suppression signal output from said peak suppression unit while an output stop signal is input from said signal quality estimation unit, wherein the signal quality estimation unit outputs the output stop signal to the output stop unit if it judges that a signal quality of the peak suppression signal does not meet a required quality.

The seventh aspect of the present invention makes it possible to stop an external output of the peak suppression signal until it satisfies the required quality.

An eighth aspect of the present invention is characterized as the sixth aspect being such that said signal quality estimation unit controls said degree of peak suppression so as to make the signal quality of the peak suppression signal always equal to or better than a required quality.

The eighth aspect of the present invention makes it possible to externally output only a peak suppression signal satisfying the required quality without equipping the output stop unit, thereby enabling an accomplishment of the similar function as that of the seventh aspect by providing a smaller scale circuit than that of the seventh aspect.

A ninth aspect of the present invention, according to the first aspect, is configured such that a transmission signal suppressed by said peak suppression unit is a multi-carrier signal, wherein said peak suppression degree control unit changes said degree of peak suppression in accordance with a signal required of the strictest required quality among individual carrier signals of the multi-carrier signal.

The ninth aspect of the present invention makes it possible to accomplish the operation and effect equivalent to those of the first aspect for a multi-carrier signal.

A tenth aspect of the present invention, according to the ninth aspect, is configured such that the peak suppression degree control unit comprises a highest-quality type selection unit for selecting the highest quality from among required qualities that are set in quality requirement information of individual carrier signal of said multi-carrier signal, and a peak suppression degree determination unit for determining said degree of peak suppression based on the highest quality selected by the highest-quality type selection unit.

The tenth aspect of the present invention is configured to equip the highest-quality type selection unit and peak suppression degree determination unit, thereby enabling an accomplishment of the function and effect of the ninth aspect.

The present invention is contrived to control for changing a degree of suppression of a peak power of a signal to be input to a transmission amplifier in accordance with a required quality of the signal (i.e., the transmission signal) to be transmitted, thereby making it possible to minimize a PAPR of a signal (i.e., a signal as a result of applying peak suppression to the transmission signal) to be input to the transmission amplifier. Therefore, the present invention enables an output of the transmission signal from the transmission amplifier amplifying it so as to satisfy the required quality while operating the transmission amplifier in high efficiency.

BRIEF DESCRIPTION OF THE DRAWINGS

FIG. 7 is a diagram showing a definition table of an EVM for an AMC specified by IEEE802-16e (WiMax) Standard.

FIGS. 12A through 12D are diagrams showing constellation of signals of various signal modulation system.

FIG. 14 is a configuration diagram of a table used for the quality information estimation unit estimating a modulation system of an input signal.

FIG. 20 is a block diagram showing a circuit configuration of a BER calculation unit equipped within the signal quality estimation unit shown in FIG. 15 or 18.

FIG. 21 is a block diagram showing a circuit configuration of an EVM estimation value calculation unit equipped within the signal quality estimation unit shown in FIG. 15 or 18.

FIG. 22 is a block diagram showing a circuit configuration of a power difference calculation unit equipped within the signal quality estimation unit shown in FIG. 15 or 18.

FIG. 23 is a block diagram showing a circuit configuration of a fourth embodiment of the present invention.

FIG. 26 is a block diagram showing a configuration of an ACLR estimation process unit equipped within the signal quality estimation unit shown in FIG. 25.

FIG. 27 is a diagram showing a calculation result (i.e., a spectrum) of the FFT calculation unit shown in FIG. 26.

FIG. 28 is a block diagram showing a configuration of a circuit determining a peak suppression threshold value according to a seventh embodiment of the present invention.

FIG. 29 is a diagram showing a structure of a table comprised within the highest quality selection unit (i.e., a first configuration).

FIG. 31 is a flow chart showing an operation of the highest quality selection unit (i.e., a second configuration) shown in FIG. 28.

DESCRIPTION OF THE PREFERRED EMBODIMENTS

The following is a description of the preferred embodiments of the present invention by referring to the accompanying drawings.

[Outline of the Present Invention]

The present invention is contrived to change a degree of peak suppression of a power amplifier (noted as "transmission amplifier" hereinafter) in accordance with a required quality of a signal to be transmitted, and apply peak suppression to the transmission amplifier so as to satisfy the signal quality required of an individual signal. That is, to maintain high quality by not applying strong peak suppression to a signal required of a high quality level. Contrarily, to raise an operation point by applying strong peak suppression for a signal required of a low quality level, thereby increasing a transmission power, or minimizing a back-off of the transmission amplifier. As a result, the transmission amplifier can be operated in high efficiency.

First Embodiment

The present embodiment is configured to change a degree of peak suppression of a transmission signal by obtaining quality requirement information from a baseband signal generation unit.

Figure 8:
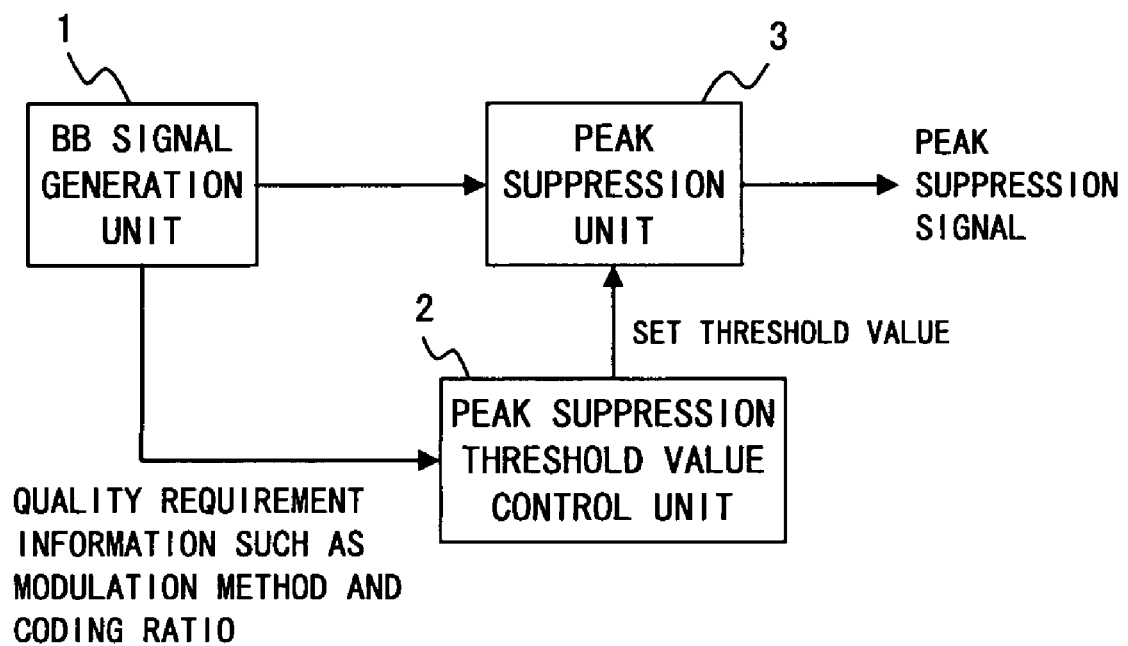
FIG. 8 is a block diagram showing a configuration of a first embodiment of the present invention.

FIG. 8 is a block diagram showing a configuration of the first embodiment of the present invention.

The first embodiment comprises a baseband signal generation unit (i.e., BB signal generation unit) 1, a peak suppression threshold value control unit 2 and a peak suppression unit 3. The baseband signal generation unit 1 converts a voice signal at the time of a telephone call (noted as "call" hereinafter) and various data into a baseband signal suitable to a radio transmission, and output their converted signal to the peak suppression unit 3. When outputting a baseband signal to the peak suppression unit 3, the baseband signal generation unit 1 outputs information (a modulation method and a coding ratio) related to the baseband signal to the peak suppression threshold value control unit 2.

The peak suppression threshold value control unit 2 sets a threshold value to be used for determining a degree of peak suppression of a signal in a peak suppression method based on the information input from the baseband signal generation unit 1, and outputs the threshold value to the peak suppression unit 3. The peak suppression unit 3 suppresses a peak component of the baseband signal input from the baseband signal generation unit 1 based on the threshold value input from the peak suppression threshold value control unit 2. The peak suppression unit 3 outputs a baseband signal as a result of suppressing a peak component (i.e., a peak suppression signal).

Figure 9:
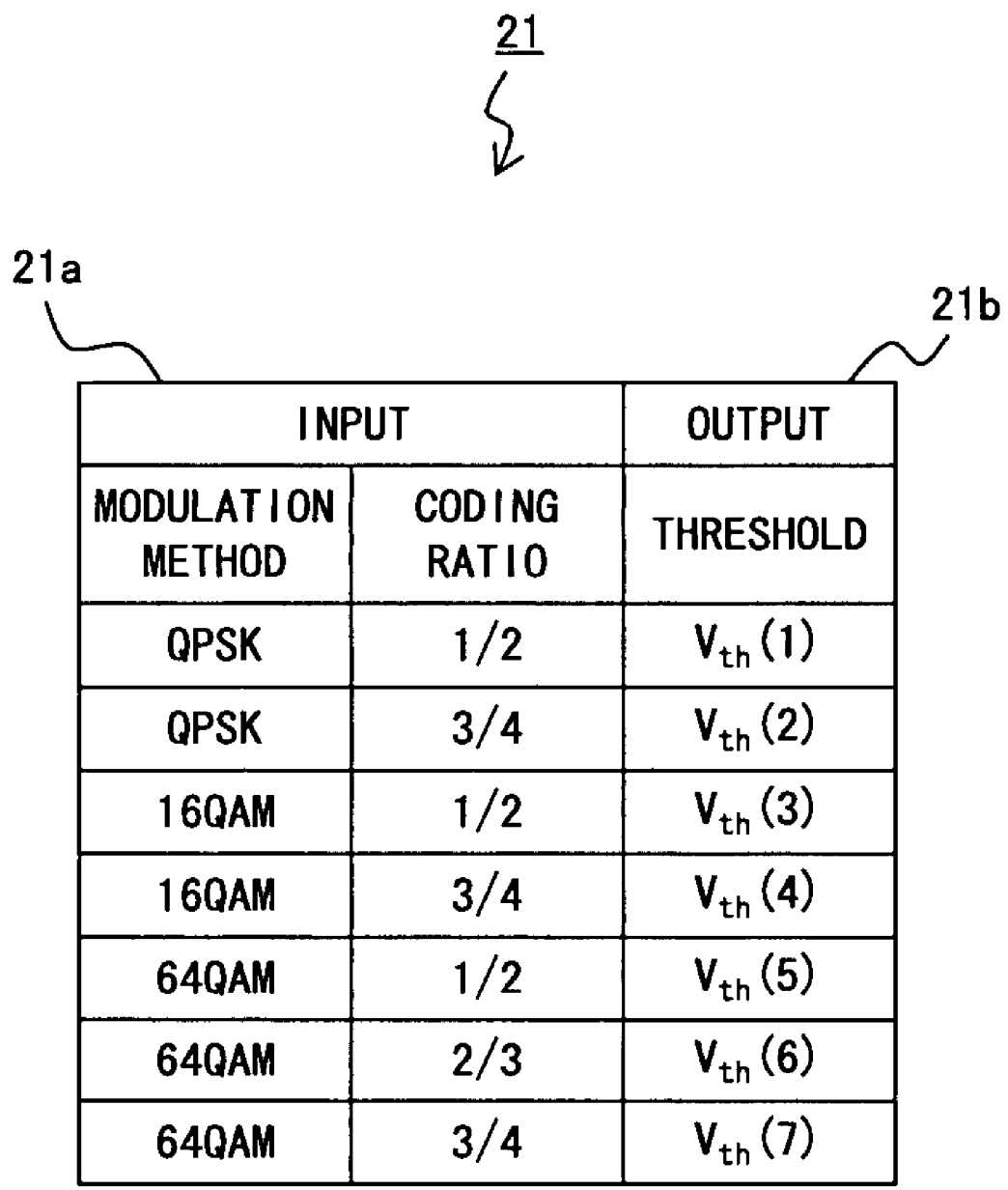
FIG. 9 is a diagram showing a configuration of a conversion table comprised by a peak suppression threshold value control unit shown in FIG. 8.

The peak suppression threshold value control unit 2, comprising a conversion table 21 shown in FIG. 9 for example, searches the conversion table 21, reads a threshold value corresponding to a set (i.e., a modulation system and a coding ratio) received from the baseband signal generation unit 1, and outputs the threshold value to the peak suppression unit 3.

Each entry of the conversion table 21 registers a record constituted by an input item 21a and an output item 21b. The input item 21a is a set of "modulation method" and "coding ratio". The output item 21b is "threshold value". The input item 21a of the conversion table 21 registers a Quadrature Phase Shift Keying (QPSK), a 16 Quadrature Amplitude Modulation (16QAM) and 64QAM, with the respective modulation systems being registered by being categorized into a plurality of coding ratios. In the case of the QPSK, two kinds of the coding ratio, i.e., "1/2" and "3/4", are registered and a threshold value corresponding to each coding ratio is registered in the output item 21b of the same record. The threshold value for the coding ratio of 1/2 is Vth(1), and that for the coding ratio of 3/4 is Vth(2).

Figure 1:
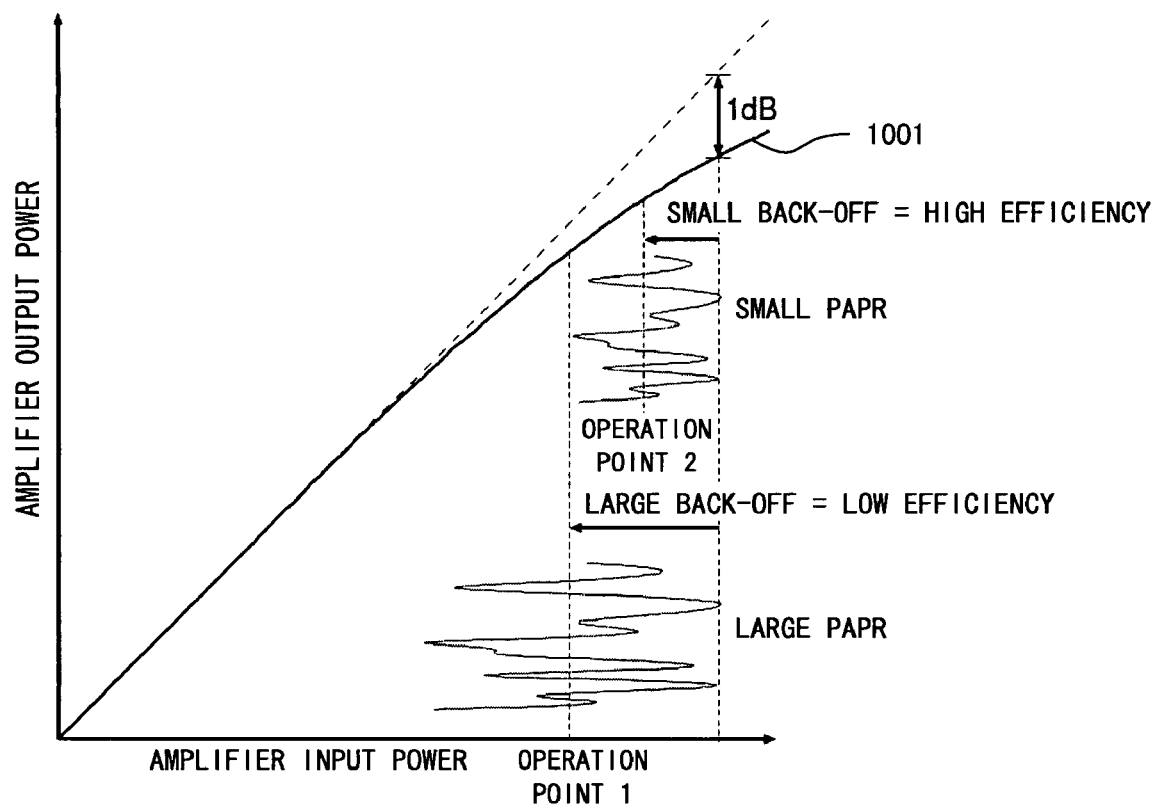
FIG. 1 is a diagram showing a relationship of an input/output characteristic of a transmission amplifier with a peak of a signal.
Figure 2:
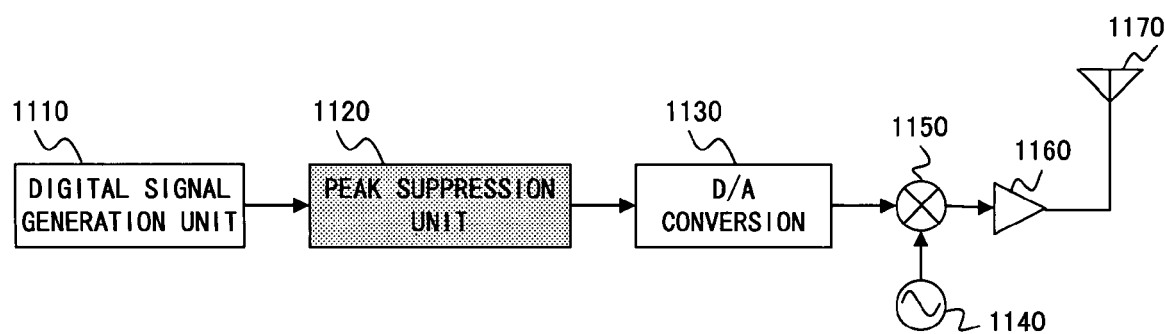
FIG. 2 is a diagram showing a circuit configuration of a peak suppression method.
Figure 3:
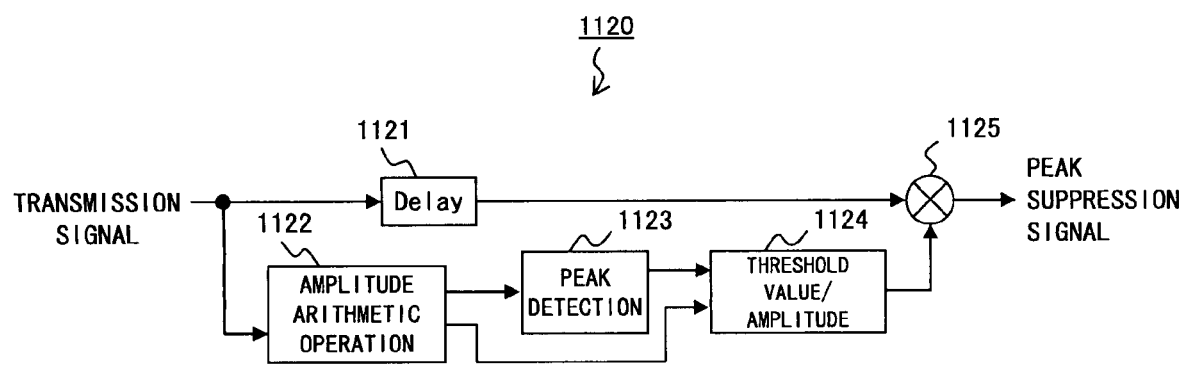
FIG. 3 is a diagram showing a circuit configuration of a peak suppression unit of a clip method.
Figure 4:
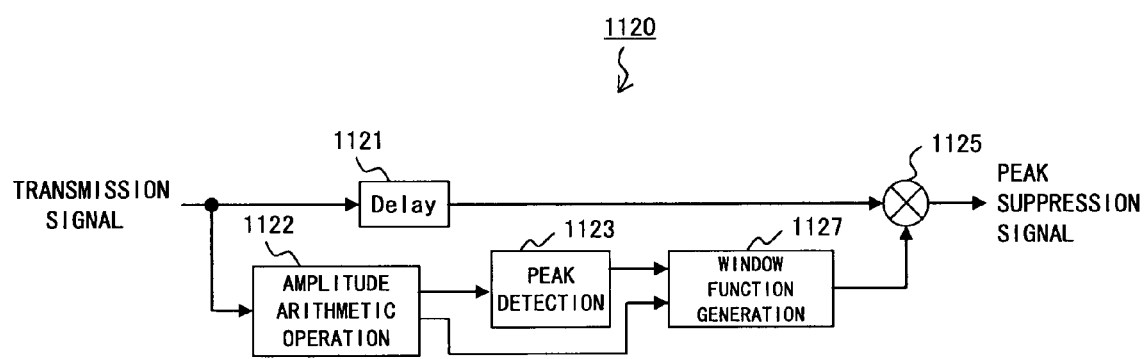
FIG. 4 is a diagram showing a circuit configuration of a peak suppression unit of a window function method.
Figure 5:
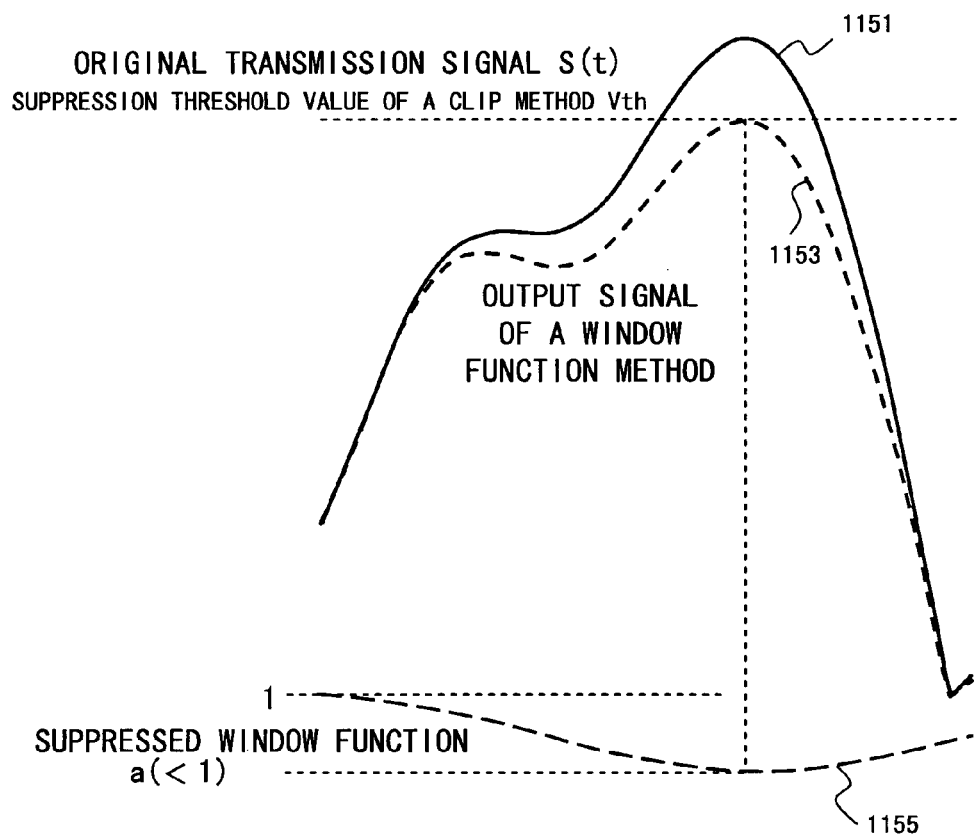
FIG. 5 shows an original transmission signal, an output signal of a peak suppression circuit of the clip method and that of a peak suppression circuit of the window function method.
Figure 6:
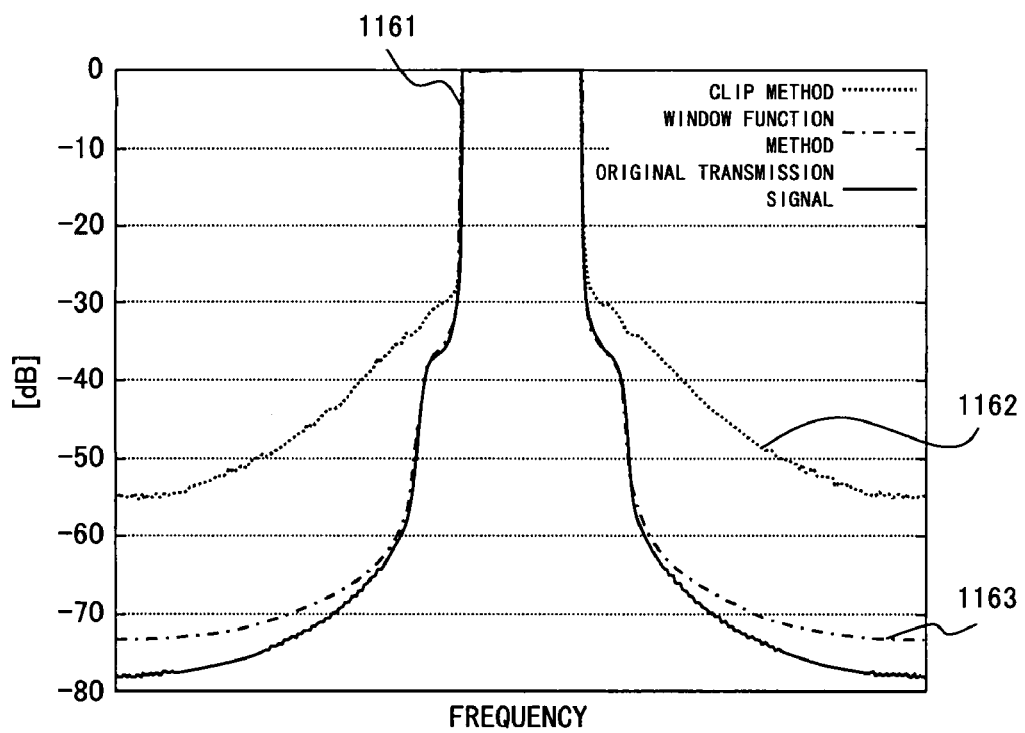
FIG. 6 shows spectra when applying a clip method and a window function method to an original transmission signal S(t).

The peak suppression unit 3 suppresses an amplitude to a threshold value if the amplitude of a baseband signal input from the baseband signal generation unit 1 exceeds the threshold value (i.e., the peak suppression threshold value) input from the peak suppression threshold value control unit 2 by means of the above described clip method shown by FIG. 3, or 4.

Second Embodiment

The first embodiment is configured to obtain the quality information of a signal from the baseband signal generation unit 1 as described above. The second estimates a signal quality based on a baseband signal generated by the baseband signal generation unit, and determines a degree of peak suppression based on the signal quality.

Figure 10:
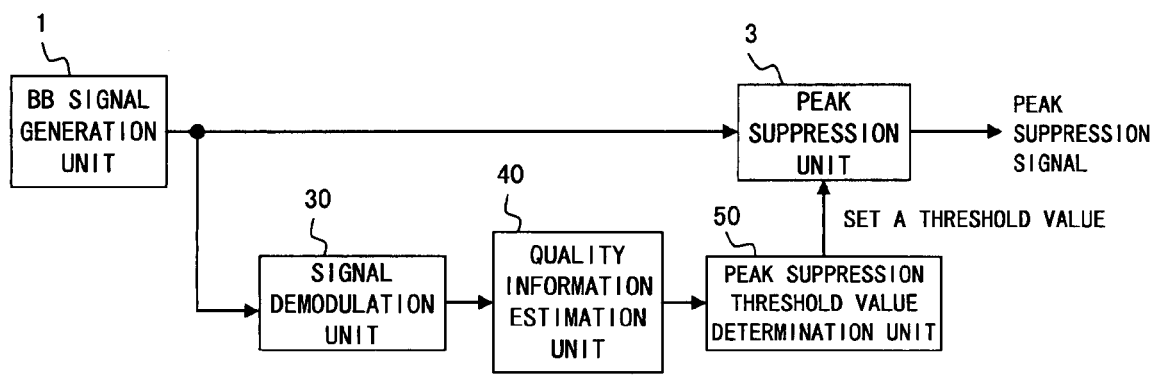
FIG. 10 is a block diagram showing a configuration of a second embodiment of the present invention.

FIG. 10 is a block diagram showing a configuration of the second embodiment of the present invention. The same component sign is assigned to the same constituent component as that of the first embodiment of FIG. 8 in the showing of FIG. 10.

The second embodiment comprises a baseband signal generation unit 1, a peak suppression unit 3, a signal demodulation unit 30, a quality information estimation unit 40 and a peak suppression threshold value determination unit 50.

The signal demodulation unit 30 converts a baseband signal input from the baseband signal generation unit 1 into a signal allowing an extraction of the quality information (meaning "information on quality") of a signal. If it is a signal modulated by an OFDM (Orthogonal Frequency Division Multiple Access) method for example, the baseband signal is subjected to a process reverting it back to a signal on a frequency axis (i.e., a complex symbol) by means of an FFT.

If it is a baseband signal applied by an AMC (Adaptive Modulation and Coding) for example, the quality information estimation unit 40 calculates a constellation of a real part component (i.e., an in-phase component) and an imaginary part component (i.e., a quadrature component) of the signal and estimates a modulation method based on the constellation. Other than the method described above, what is conceivable is a configuration for extracting quality information from a control signal included in the signal.

The peak suppression threshold value determination unit 50 determines a threshold value based on the information of a modulation method input from the quality information estimation unit 40, and outputs the threshold value to the peak suppression unit 3.

{Configuration Example of the Signal Demodulation Unit 30}

Figure 11:
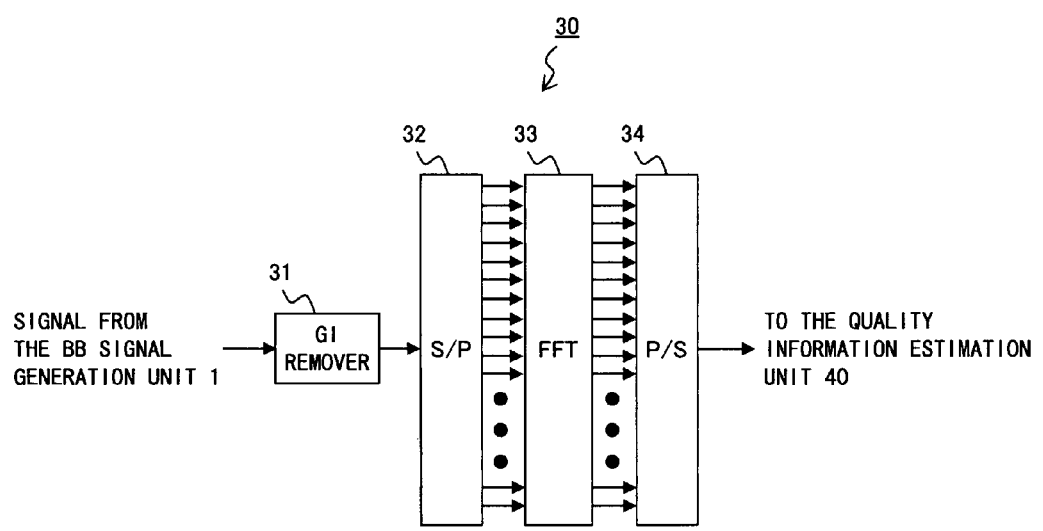
FIG. 11 is a block diagram showing a configuration example of a signal demodulation unit shown in FIG. 10.

FIG. 11 is a block diagram showing a configuration example of the signal demodulation unit 30.

FIG. 11 is a configuration diagram of the signal demodulation unit 30 demodulating a baseband signal modulated by the OFDM method. The signal demodulation unit 30 comprises a Guard Interval (GI) remover 31, a serial/parallel (S/P) converter 32, an FFT transformer 33 and a parallel/serial (P/S) converter 34.

The GI remover 31 removes a Guard Interval (GI) from a baseband OFDM signal (noted as "OFDM signal" hereinafter) modulated by the OFDM method and outputs the OFDM signal with the GI being removed to the S/P converter 32. The S/P converter 32 converts the input OFDM signal from the serial to parallel, divides it into an N-piece of sample values (where N is a natural number) modulated by different subcarriers (i.e., transport carriers), and outputs them to the FFT transformer 33. The FFT transformer 33 applies a Fourier transform to the individual sample values input from the S/P converter 32 and extracts an N-piece of complex symbols. The P/S converter 34 restores a complex symbol string by converting the N-piece of complex signals input from the FFT transformer 33 from the parallel to serial, and outputs the complex symbol string to the quality information estimation unit 40.

{Quality Information Estimation Unit 40}

(1) Configuration

FIGS. 12A through 12D are diagrams showing constellation of signals of various signal modulation system. These drawings show constellation of—FIG. 12A: BPSK, FIG. 12B: QPSK, FIG. 12C: 8PSK, and FIG. 12D: 16QAM. Referring to FIGS. 12A through 12D, the horizontal axis is an in-phase component (i.e., the I component) and the vertical axis is a quadrature component (i.e., the Q component). Therefore, the position of a signal point (shown by "●" in the drawings) of FIGS. 12A through 12D is expressed by coordinates (I, Q) on an I-Q complex plane.

The quality information estimation unit 40 extracts the I components and Q components of respective symbols which are included in a complex symbol string input from the signal demodulation unit 30, followed by estimating a modulation method of the baseband signal based on the array structure of a signal point (I, Q). That is, it examines as for which of the array structures of FIGS. 12A through 12D to which the array structure of the signal point (I, Q) corresponds, and figures out a modulation method matching with the array structure.

(Operation)

Figure 13:
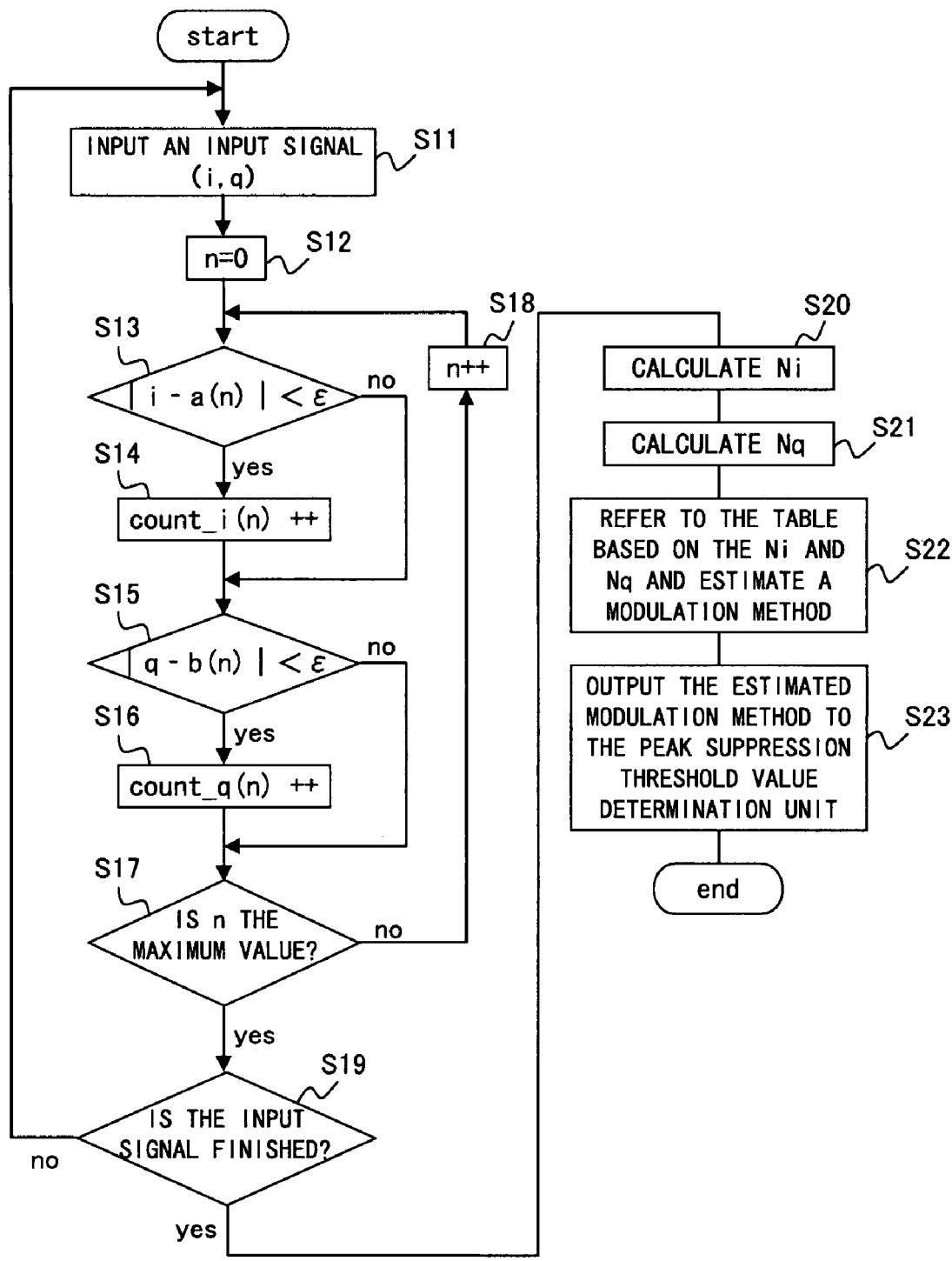
FIG. 13 is a flow chart showing a process for a quality information estimation unit shown in FIG. 10 estimating a modulation system of an input signal.

FIG. 13 is a flowchart showing a process for the quality information estimation unit 40 estimating a modulation method of an input signal. The amplitude of the I component of a signal is expressed by "i" and that of the Q component of the signal is expressed by "q". The following lists the other variables and the functions of fixed values:

n: variable
a(n): amplitude candidate of I axis of a signal
b(n): amplitude candidate of Q axis of a signal
count_i (n): the number of times that the value of i being judged as b(n)
count_q(n): the number of times that the value of q being judged as a(n)
Ni: the number of terms of nonzero within count_i
Nq: the number of terms of nonzero within count_q
$\epsilon$: error (extremely small value)

The count_i consists of five terms, i.e., count_i(0) through count_i(4) in the present embodiment. The count_q consists of five terms, i.e., count_q(0) through count_q(4). Therefore, the Ni is the number of values an I component can possibly take, and the Nq is the number of values a Q component can take.

The next is a description of the flow chart shown by FIG. 13.

The quality information estimation unit 40 inputs a waveform signal (i, q) of one symbol of an input signal (S11), followed by inputting a waveform signal by the unit of symbol sequentially starting at the head symbol of the input signal in the step S11, and initially setting n at "0" (S12).

It then judges whether $|i-a(n)|<\epsilon$ (S13) and, if the judgment is $|i-a(n)|<\epsilon$, shifts the process to the step S14, otherwise shifts the process to the step S15. The step S13 is the process for judging whether or not i=a(n), and if the judgment is $|i-a(n)|<\epsilon$, then i=a(n) can be regarded as true because an $\epsilon$ is a very small value. This judgment takes a numeric error of i into consideration.

The quality information estimation unit 40 increments a value of count_i(n) by "1" in the step S14. Upon finishing the process of the step S14, it shifts the process to the step S15.

Steps S13 and S14 are the process for judging whether the equivalent to an a(n) exists among the amplitude of the common-mode of the input signal.

It then judges whether $|q-b(n)|<\epsilon$ in the step S15. If it is so, shifts the process to the step S16, otherwise shifts the process to the step S17. It increments a value of count_q(n) by "1", and shifts the process to the step S17.

The steps S15 and S16 are processes for judging whether or not the equivalent to b(n) exists in the amplitudes of orthogonal components of the input signal.

It judges whether a value of n is equal to the maximum value (i.e., "5" in the case of the present embodiment) in the step S17, and if it is not equal to the maximum value, shifts the process to the step S18, while if it is equal thereto, it shifts the process to the step S19. The quality information estimation unit 40 increments a value of n by "1" in the step S18.

As such, the processes of the steps S13 through S18 are repeated until a value of n is judged to be equal to the maximum value (i.e., "4" according to the present embodiment) in the step S18. The processes described above examines as for which of the a(0) through a(4) the value of i is equal to and which of the b(0) through b(4) the value of q is equal to. And a value of count_i(k) or count_q(k) corresponding to the equal value is incremented by "1". Here, k is either one number among "0" through "4".

Having judged that n is equal to the maximum value in the step S17, the unit quality information estimation 40 judges whether the input signal is finished, and if it is not finished, shifts the process to the step S11, while if it is finished, shifts the process to the step S20.

As such, the processes of the steps S11 through S19 are carried out for waveform signals (i, q) of all symbols of the input signal. As a result, the information necessary for judging the constellation of the input signal is stored in count (i.e., count_i(0), count_i(1), count_i(2), count_i(3) and count_i(4)), and count_q (i.e., count_q(0), count_q(1), count_q(2), count_q(4) and count_q(4)) at the time of the input signal being judged to be finished in the step S19.

The unit quality information estimation 40 examines values of count_i(0) through count_i(4), and obtains a value of Ni which is the number of terms in which a value is not "0" among the five terms, i.e., count_i(0) through count_i(4). Then it examines values of count_q(0) through count_q(4), and obtains a value of Nq (S21). The Nq is the number of terms of which a value is not "0" among the five terms, i.e., count_q(0) through count_q(4).

Then it searches in a table 41 shown in FIG. 14 based on the values of the Ni and Nq, estimates a modulation method of the input signal (S22), outputs the estimated modulation method to the peak suppression threshold value determination unit 50 (S23) and ends the process of the present flow chart.

The next is a description on a configuration of the table 41 that the quality information estimation unit 40 comprises. Each row of the table 41 is constituted by three items, i.e., "Ni", "Nq" and "modulation method", with the values of Ni and Nq being the values corresponding to the modulation method registered in the same row. The first, second, third and fourth rows register the respective modulation method, i.e., "BPSK", "QPSK", "8PSK" and "16QAM", respectively, along with corresponding "Ni" and "Nq". This enables the quality information estimation unit 40 to estimate a modulation method of the input signal by searching in the table 41 by the Ni and Nq as keys.

Third Embodiment

The third embodiment is configured to estimate a signal quality based on a baseband signal output from a baseband signal generation unit 1 and on a signal of a result of applying a peak suppression process to a baseband signal output from a peak suppression unit 3, and set a threshold value (i.e., a peak suppression threshold value) to be output to the peak suppression unit 3 based on the estimated signal quality. The signal quality uses, for example, BER (Bit Error Rate), EVM (Error Vector Magnitude) and "an attenuation of a signal power due to peak suppression" (abbreviated as "signal power attenuation" hereinafter).

Different from the case of quality information being directly known, such as a modulation method, when estimating a signal quality degraded by the peak suppression unit 3, it is necessary to estimate a signal quality by carrying out peak suppression once at the peak suppression unit 3 and repeat the process of setting a threshold value based on the estimation result.

{First Configuration}

The first configuration is configured to apply peak suppression by the maximum threshold value for satisfying the condition of "estimated quality being better than required quality", thereby making it possible to minimize a peak power of an input signal of a transmission amplifier and reduce an adjacent channel power ratio (ACPR).

Figure 15:
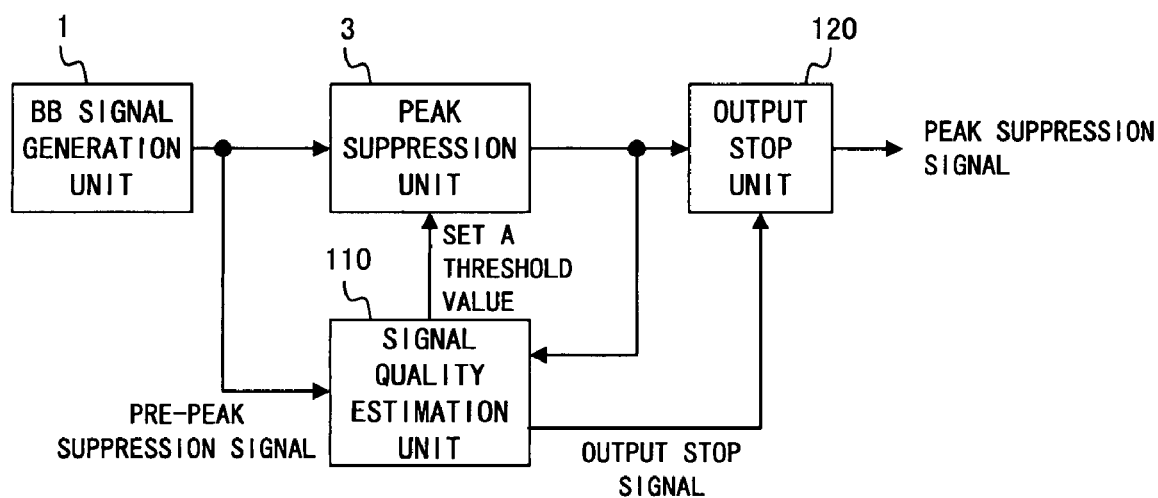
FIG. 15 is a block diagram showing a first configuration of a third embodiment of the present invention.

FIG. 15 is a block diagram showing the first configuration of the third embodiment. The same component sign is assigned to the same constituent component as that of FIG. 8 in the showing of FIG. 15.

The third embodiment comprises a baseband signal generation unit 1, a peak suppression unit 3, a signal quality estimation unit 110 and an output stop unit 120.

The signal quality estimation unit 110 receives an input of a baseband signal (i.e., a pre-peak suppression signal) from the baseband signal generation unit 1 and that of a signal (i.e., a post-peak suppression signal) of a result of applying a peak suppression process to the baseband signal from the peak suppression unit 3. The signal quality estimation unit 110 estimates signal quality of the baseband signal degraded by the peak suppression unit 3 based on the aforementioned two signals, followed by comparing the estimated signal quality (i.e., the estimated quality) with a required quality and obtains a threshold value for the peak suppression unit 3 so as to make a peak suppression quality output therefrom equal to or better than the required quality. Having obtained the threshold value, the signal quality estimation unit 110 outputs it to the peak suppression unit 3 and also stops outputting an output stop signal to the output stop unit 120.

The output stop unit 120 stops the output of a signal (i.e., a peak suppression signal) input from the peak suppression unit 3 during the input of the output stop signal from the signal quality estimation unit 110. Upon stopping the input of the output stop signal, the output stop unit 120 outputs the peak suppression signal input from the peak suppression unit 3.

{First Operation in the First Configuration}

Figure 16:
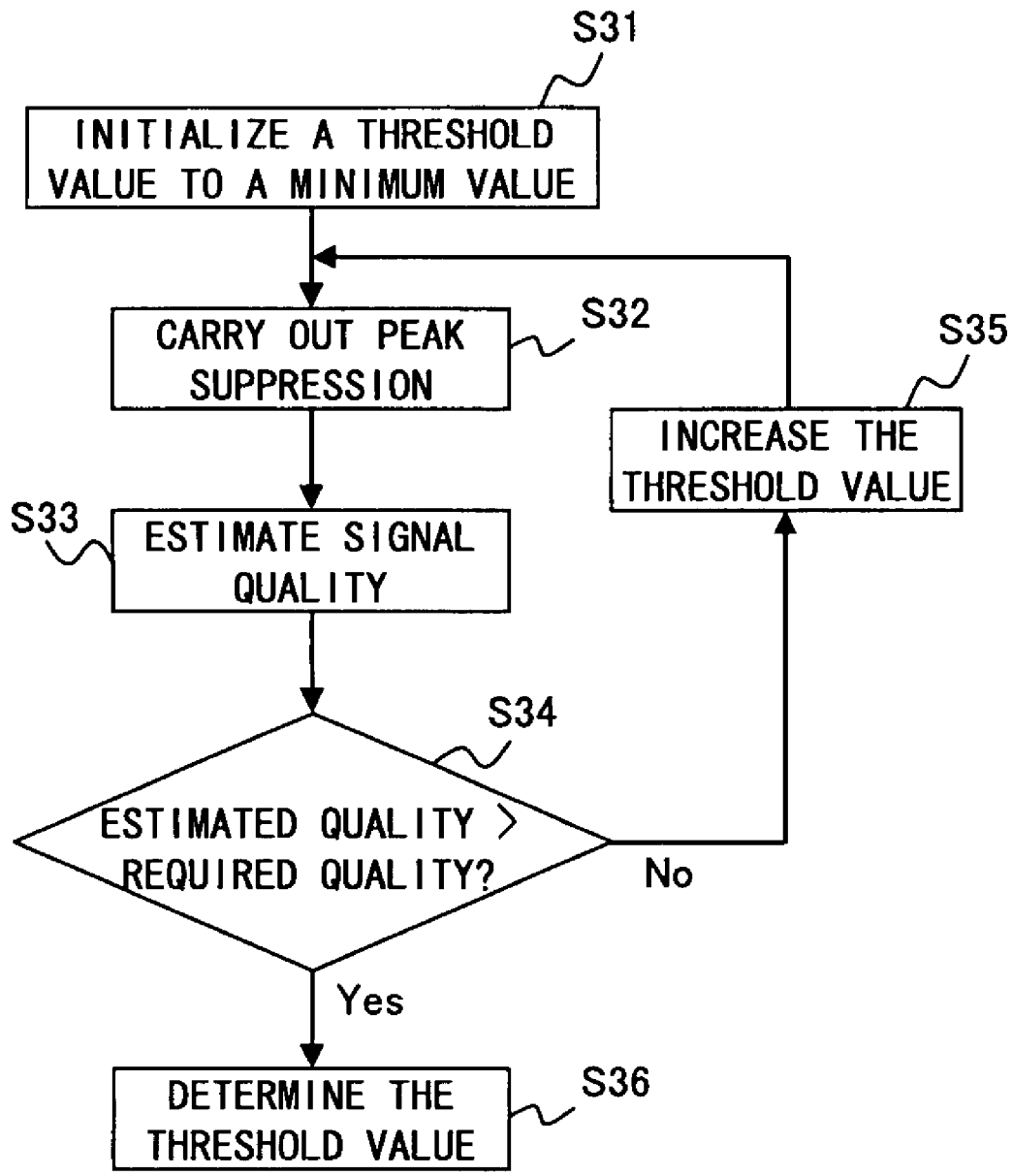
FIG. 16 is a flow chart showing a first operation of the signal quality estimation unit shown in FIG. 15.

FIG. 16 is a flow chart describing a threshold value setup operation of the signal quality estimation unit 110 shown in FIG. 15.

Prior to starting the process of the flow chart, the signal quality estimation unit 110 outputs an output stop signal to the output stop unit 120, thereby making an output thereof stopped.

After making the output of the output stop unit 120 stopped, the signal quality estimation unit 110 sets a threshold value at a predetermined minimum value and outputs the threshold value to the peak suppression unit 3 (S31). The peak suppression unit 3 suppresses a peak component of the baseband signal, which is input from the baseband signal generation unit 1, based on the threshold value, and outputs the peak component-suppressed baseband signal (i.e., the peak suppression signal) to the signal quality estimation unit 110 and the output stop unit 120 (S32).

The signal quality estimation unit 110 estimates a signal quality of the post-peak suppression signal based on the base band signal prior to being applied by peak suppression (i.e. the pre-peak suppression signal), which is input from the baseband signal generation unit 1, and the post-peak suppression signal input from the peak suppression unit 3 (S33). The signal quality estimation unit 110 then compares an estimated quality of the post-peak suppression signal (noted as "estimated quality" hereinafter) obtained in the step S33 with a required quality of a predefined post-peak suppression signal (noted as "required quality" hereinafter) and judges whether or not "estimated quality is better than required quality" (S34). Then, if the judgment is not an "estimated quality being better than required quality", it shifts the process to the step S35, otherwise to the step S 36.

The signal quality estimation unit 110 increases the threshold value and outputs the increased threshold value to the peak suppression unit 3 in the step S35, followed by returning the process to the step S32.

The processes of the steps S32 through S35 are repeated until the signal quality estimation unit 110 judges "estimated quality being better than required quality" in the step S34. Having judged so in the step S34, the signal quality estimation unit 110 determines the threshold value currently set in the peak suppression unit 3 to be the threshold value for peak suppression and stops the output of the output stop signal to the output stop unit 120 (S36). By this, the output stop unit 120 lifts an output stoppage of the peak suppression signal input from the peak suppression unit 3 and externally outputs the peak suppression signal.

Thus, the first configuration is configured to set peak suppression small for a baseband signal output from the baseband signal generation unit 1, thereby improving quality of a signal output from the transmission amplifier.

{Second Operation in the First Configuration}

The first operation sometimes allows a delayed output of a peak suppression signal due to an excessive time for determining a threshold value. Accordingly, an output of a peak suppression signal within a predefined time is guaranteed by limiting the time taking until the signal quality estimation unit 110 determining the threshold value.

Figure 17:
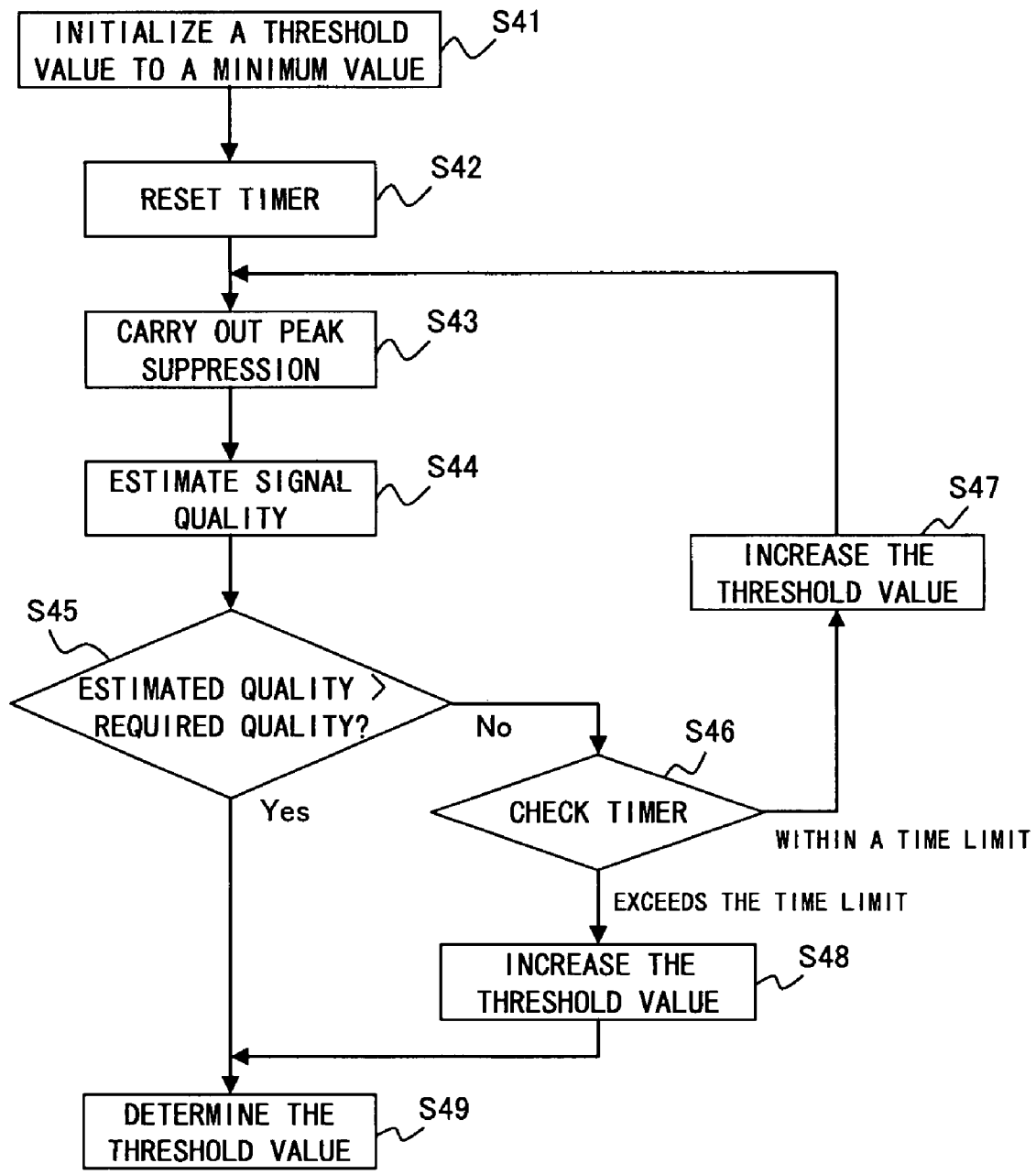
FIG. 17 is a flow chart showing a second operation of the signal quality estimation unit shown in FIG. 15.

FIG. 17 is a flow chart showing a process modifying the process of FIG. 16 so as to limit the time for the signal quality estimation unit 110 determining the threshold value. The signal quality estimation unit 110 carrying out the process is internally equipped with a timer (not shown herein) for measuring time of a process elapsed time.

Having outputted an output stop signal to the output stop unit 120, the signal quality estimation unit 110 initializes a threshold value that is set in the peak suppression unit 3 to a minimum value and outputs the threshold value to the peak suppression unit 3 (S41), followed by resetting the timer to start measuring time (S42).

The peak suppression unit 3 applies a peak suppression process to a baseband signal input from the baseband signal generation unit 1 based on the threshold value input from the signal quality estimation unit 110, and outputs the peak suppression signal to the signal quality estimation unit 110 and the output stop unit 120. The signal quality estimation unit 110 estimates a signal quality in a similar manner as the steps S33 and S34 shown in FIG. 16 (S44) and judges whether or not "estimated quality is better than required quality" (S45).

Judging as not "estimated quality being better than required quality" in the step S45, the signal quality estimation unit 110 shifts the process to the step S46, otherwise shifts the process to the step S47.

The signal quality estimation unit 110 checks a measured time of the timer and judges whether the measured time is within a predefined time limit in the step S46, and if the measured time is within the time limit, it increases the threshold value and outputs it to the peak suppression unit 3 (S47). Upon finishing the process of the step S47, the process returns to the step S43.

As such, the processes of the steps S43 through S47 are repeated for as long as it is not "estimated quality being better than required quality" and also the threshold value determination process time is within a time limit. Then, if the signal quality estimation unit 110 judges as "estimated quality being better than required quality" in the step S45, or if the signal quality estimation unit 110 judges as the threshold value determination process time exceeding the time limit in the step S46, the repeated process is ended.

Having judged that the measured time of the timer exceeds the time limit of the threshold value determination process time, the signal quality estimation unit 110 increases the threshold value amply (S48), determines the threshold value to be the final threshold value, outputs it to the peak suppression unit 3 and also stops the output stop signal that has been output to the output stop unit 120 (S49).

It sets a threshold value so as to make "estimated quality being better than required quality" in the step S48. This is for example enabled by pre-examining a threshold value for the peak suppression unit 3 so as to make "estimated quality being better than required quality".

Meanwhile, judging that "estimated quality being better than required quality" in the step S45, the signal quality estimation unit 110 performs the process of the step S49 as described above.

As such, the signal quality estimation unit 110 is enabled to determine a threshold value so that a peak suppression signal output from the peak suppression unit 3 satisfies a required quality within a predefined time limit.

{Second Configuration}

The second configuration is configured to control peak suppression so that an output signal of the transmission amplifier always satisfies "estimated quality being better than required quality". The control is to set the threshold value amply large value initially, followed by decreasing the threshold value gradually for obtaining a minimum threshold value satisfying "estimated quality being better than required quality". This makes it possible to minimize a PAPR of an input signal of a transmission amplifier and hence operate it in high efficiency.

Figure 18:
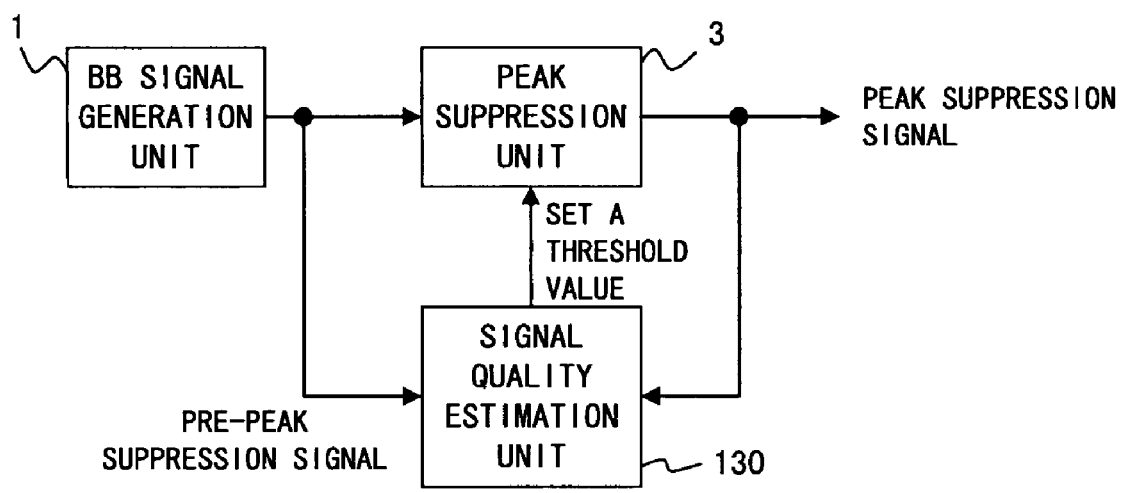
FIG. 18 is a block diagram showing a second configuration of the third embodiment.

FIG. 18 is a block diagram showing a second configuration of the third embodiment. The same component sign is assigned to the same constituent component as that of FIG. 8 in the showing of FIG. 18. The second configuration is configured to eliminate the output stop unit 120 from the first configuration.

In the present second configuration, a signal quality estimation unit 130 controls a threshold value to be output to the peak suppression unit 3 so that a peak suppression signal output from the peak suppression unit 3 always satisfies "estimated quality being better than required quality". In this event, it sets the threshold value amply large value initially, followed by gradually decreasing the threshold value in stepwise for obtaining a minimum threshold value satisfying "estimated quality being better than required quality". This makes it possible to operate a transmission amplifier at high power efficiency.

This is why the present embodiment can eliminate the output stop unit 120 that is required for the first configuration.

{Operation of the Second Configuration}

Figure 19:
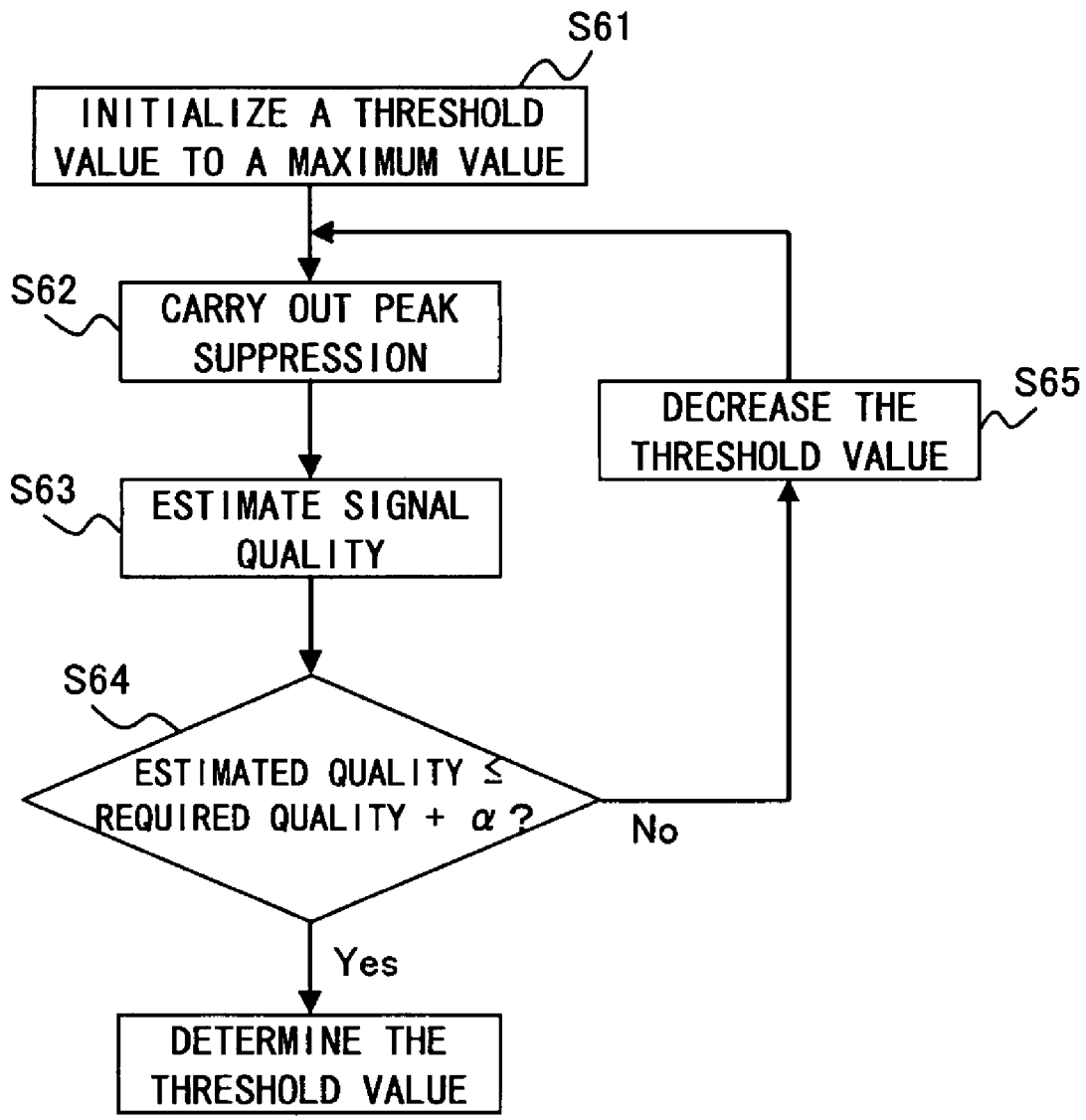
FIG. 19 is a flow chart showing an operation of the signal quality estimation unit shown in FIG. 15.

FIG. 19 is a flow chart showing an operation of the second configuration.

The signal quality estimation unit 130 initializes a threshold value to a predetermined maximum value and outputs the threshold value to the peak suppression unit 3 (S61). The maximum value that is set as the threshold value in the step S61 is a value to make quality (i.e., estimated quality) of the post-peak suppression signal amply better than "required quality+$\alpha$". The peak suppression unit 3 applies a peak suppression process to a baseband signal input from the baseband signal generation unit 1 based on the threshold value, outputs the peak suppression signal to the signal quality estimation unit 130 and also outputs it externally (S62).

The signal quality estimation unit 130 estimates a signal quality based on the pre-peak suppression signal input from the baseband signal generation unit 1 and the post-peak suppression signal input from the peak suppression unit 3 (S63), followed by judging whether or not "estimated quality being not greater than required quality+$\alpha$" (S64), where the $\alpha$ is a constant, and is an appropriate value guaranteeing the estimate quality is equal to or better than the required quality even if the judgment is "estimated quality being not greater than required quality+α". That is, when initially judged to be "estimated quality being not greater than required quality+ α", the quality of the transmission signal output from the transmission amplifier satisfies the required quality.

Having judged as not "estimated quality being not greater than required quality+α" in the step S63, the signal quality estimation unit 130 decreases the threshold value and outputs the threshold value to the peak suppression unit 3 (S65), followed by the process returning to the step S62.

As such, the process of the steps S62 through S65 is repeated until "estimated quality being not greater than required quality+α" is judged in the step S64. Upon judging as "estimated quality being not greater than required quality+ α" in the step S64, the signal quality estimation unit 130 determines the threshold value presently set in the peak suppression unit 3 to be the final threshold value and terminates the threshold value control (S66).

The peak suppression unit 3 hereafter suppresses a peak component of a baseband signal input from the baseband signal generation unit 1 heavily to the extent of the minimum value so that the quality of the output signal of the transmission amplifier satisfies the required quality. As a result, the PAPR is reduced and therefore it is possible to increase a transmission power by raising the operation point of the transmission amplifier. Also enabled is to operate the transmission amplifier in high efficiency by minimizing the back-off power thereof.

{First Embodiment of the Signal Quality Estimation Unit}

The first embodiment of the signal quality estimation unit (i.e., the signal quality estimation unit 110 shown in FIG. 15 or the signal quality estimation unit 130 shown in FIG. 18) is configured to use a BER as signal quality and determine a threshold value to be set for the peak suppression unit 3 so that the BER satisfies the required quality.

FIG. 20 is a block diagram showing a circuit configuration of a BER estimation value calculation unit 200 equipped within the signal quality estimation unit. The BER estimation value calculation unit 200 is a circuit in charge of the processes of the steps S33 of FIG. 16, S44 of FIG. 17 and S63 of FIG. 19.

The BER estimation value calculation unit 200 comprises a signal demodulation unit 201 (i.e., a first signal demodulation unit), a signal demodulation unit 202 (i.e., a second signal demodulation unit), a decoding unit 211 (i.e., a first decoding unit), a decoding unit 212 (i.e., a second decoding unit), a comparison unit 220 and a BER calculation unit 230.

The signal demodulation unit 201 receives an input of a peak suppression signal from the peak suppression unit 3, demodulates the signal and outputs a transmission signal srec obtained by the modulation to the decoding unit 211. The signal demodulation unit 202 receives an input of a pre-peak suppression signal (i.e., a baseband signal) from the baseband signal generation unit 1, demodulates the signal and outputs a transmission signal sref obtained by the modulation to the decoding unit 212.

The decoding unit 211 applies an error correction process and such to the signal srec input from the signal demodulation unit 201, thereby decoding transmission data (i.e., a bit string signal), followed by outputting the bit string data (i.e., the first bit string data) to the comparison unit 220. The decoding unit 212 applies an error correction process and such to the signal sref input from the signal demodulation unit 202, thereby decoding transmission data (i.e., a bit string signal), followed by outputting the bit string data (i.e., the second bit string data) to the comparison unit 220.

The comparison unit 220 compares a pair of bits corresponding to the first bit string data and second bit string data and outputs the comparison result of each bit to the BER calculation unit 230. The comparison result is a signal indicating as to whether or not the compared bits are identical. Receiving the entirety of the comparison result from the comparison unit 220, the BER calculation unit 230 calculates a BER of the transmission signal caused by the peak suppression unit 3 and outputs the BER as a BER estimation value (i.e., a signal quality). Here, the BER is expressed by:

BER=(the number of error bits)/(the number of transmission bits)

{Second Embodiment of the Signal Quality Estimation Unit}

The second embodiment of the signal quality estimation unit is configured to use an EVM as signal quality and determine a threshold value to be set for the peak suppression unit 3 so that the EVM satisfies a required quality.

The EVM is expressed by the following expression. The unit of the EVM of the expression is %:

$$EVM = \sqrt{\frac{\sum_i |s_{ref}(i) - s_{rec}(i)|^2}{\sum_i |s_{ref}(i)|^2}} \times 100 \quad (1)$$

where sref(i): pre-peak suppression signal,
srec(i): peak suppression signal

FIG. 21 is a block diagram showing a circuit configuration of an EVM estimation value calculation unit 300 equipped within the signal quality estimation unit. The EVM estimation value calculation unit 300 is a circuit in charge of the processes of the steps S33 of FIG. 16, S44 of FIG. 17 and S63 of FIG. 19.

The EVM estimation value calculation unit 300 comprises a signal demodulation unit 301 (i.e., a first signal demodulation unit), a signal demodulation unit 302 (i.e., a second signal demodulation unit) and an EVM calculation unit 310.

The signal demodulation units 301 and 302 are circuits similar to the signal demodulation units 201 and 202, respectively. The signal demodulation unit 301 demodulates a peak suppression signal and outputs a transmission signal srec(i) obtained by the modulation to the EVM calculation unit 310. The signal demodulation unit 302 modulates a pre-peak suppression signal and outputs a transmission signal sref(i) obtained by the demodulation to the EVM calculation unit 310. The EVM calculation unit 310 calculates an EVM by using the above expression (1) and outputs the calculation result as an estimated EVM (i.e., signal quality).

{Third Embodiment of the Signal Quality Estimation Unit}

The third embodiment of the signal quality estimation unit (i.e., the signal quality estimation unit 110 shown in FIG. 15 or the signal quality estimation unit 130 shown in FIG. 18) is configured to use a power difference as signal quality and determine a threshold value to be set for the peak suppression unit 3 so that the power difference satisfies a required quality.

FIG. 22 is a block diagram showing a circuit configuration of a power difference calculation unit 400 equipped within the signal quality estimation unit. The power difference calculation unit 400 is a circuit being in charge of the processes of the steps S33 of FIG. 16, S44 of FIG. 17 and S63 of FIG. 19.

The power difference calculation unit 400 comprises a power calculation unit 401 (i.e., a first power calculation unit), a power calculation unit 402 (i.e., a second power calculation unit), a difference calculation unit 410 and a power difference integration unit 420.

The power calculation unit 401 calculates a power of a peak suppression signal in a predefined sampling cycle. The power calculation unit 402 calculates a power of a pre-peak suppression signal in a sampling cycle similar to that of the power calculation unit 401. The difference calculation unit 410 calculates a difference of power at the same sampling time calculated by the power calculation unit 401 and power calculation unit 402 (i.e., a value of a result of subtracting the power calculated by the power calculation unit 401 from that calculated by the power calculation unit 402 in the present embodiment) and outputs the calculation result to the power difference integration unit 420. The power difference integration unit 420 integrates the entirety of the power difference calculated by the difference calculation unit 410 and outputs the integration result as a power difference (i.e., signal quality).

Fourth Embodiment

The third embodiment is configured to estimate only a degradation of signal quality due to a peak suppression process; the quality, a spectrum characteristic in particular, however, is greatly varied by a nonlinear distortion of a transmission amplifier as described above. The fourth embodiment is configured to estimate a signal quality by feeding back an output of the transmission amplifier in consideration of the aforementioned aspect.

FIG. 23 is a block diagram showing a circuit configuration of the fourth embodiment. The same component sign is assigned to the same constituent component as that of FIG. 8 in the showing of FIG. 23.

The Fourth embodiment comprises a baseband signal generation unit 1, a peak suppression unit 3, a digital/analog (D/A) converter 501, a mixer 511 (i.e., a first mixer), a local oscillator 521 (a first local oscillator), a transmission amplifier 530, a mixer 512 (i.e., a second mixer), a local oscillator 522 (a second local oscillator), an analog/digital (A/D) converter 541, a signal quality estimation unit 550 and an antenna 560.

The D/A converter 501 converts a digital baseband signal (i.e., a first digital baseband signal) output from the peak suppression unit 3 into an analog baseband signal (i.e., a first analog baseband signal) and outputs it to the mixer 511. The mixer 511 multiplies the analog baseband signal by a carrier wave (i.e., a first carrier wave) output from the local oscillator 521, and outputs a radio frequency (RF) signal obtained by the multiplication to the transmission amplifier 530. The transmission amplifier 530 outputs the RF signal to the antenna 560 and also to the mixer 512. The antenna 560 emits the RF signal as radio wave to an external space.

The mixer 512 multiplies the RF signal by a carrier wave (i.e., a second carrier wave) of the same frequency as the first carrier wave output from the local oscillator 522, and outputs an analog baseband signal (i.e., a second analog baseband signal) to the A/D converter 541. The A/D converter 541 converts the second analog baseband signal to a digital baseband signal (i.e., a second digital baseband signal) and outputs it to the signal quality estimation unit 550.

The signal quality estimation unit 550 inputs the first digital baseband signal (i.e., the pre-peak suppression signal) from the baseband signal generation unit 1 and also the second digital baseband signal from the A/D converter 541. The signal quality estimation unit 550 determines a threshold value to be set for the peak suppression unit 3 based on the first and second digital baseband signals and outputs the threshold value to the peak suppression unit 3.

The signal quality estimation unit 550 is configured similar to the signal quality estimation units (110 and 130) of the above described third embodiment, estimates a BER, EVM or power attenuation, and determines a threshold value for the peak suppression unit 3 based on the estimated value. The signal quality estimation unit 550 determines the threshold value by means of an algorithm shown in FIG. 19.

Fifth Embodiment

The present embodiment is configured to add, to the configuration of the fourth embodiment shown in FIG. 23, a function of stopping an output of a transmission amplifier if an estimated quality of a peak suppression signal does not satisfy a required quality.

Figure 24:
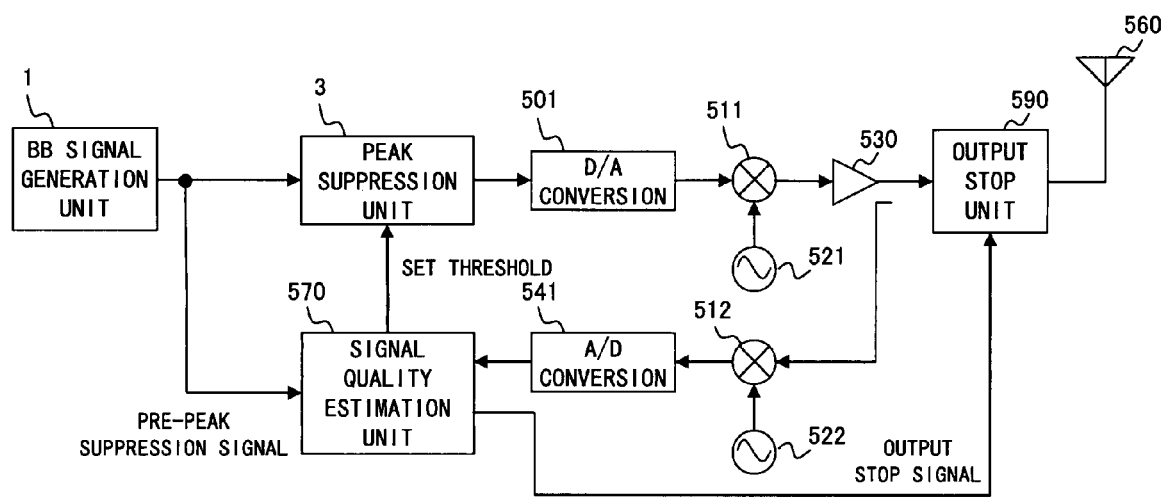
FIG. 24 is a block diagram showing a circuit configuration of a fifth embodiment of the present invention.

FIG. 24 shows a circuit configuration of the present embodiment. The same component sign is assigned to the same constituent component as that of FIG. 23 in the showing of FIG. 24.

The present embodiment is configured to equip, in the configuration of FIG. 23, an output stop unit 590 in an after stage of the transmission amplifier 530 and a signal quality estimation unit 570, in place of the signal quality estimation unit 550, for controlling the output stop unit 590.

The signal quality estimation unit 570, comprising a function similar to the signal quality estimation unit 110 of the third embodiment shown in FIG. 15, compares a pre-peak suppression signal input from the baseband signal generation unit 1 with a peak suppression signal input from the A/D converter 541, and if an estimated quality of the peak suppression signal does not satisfy a required quality, outputs an output stop signal to the output stop unit 590 for preventing an output of the transmission amplifier from being input to the antenna 560. The output stop unit 590 shuts off the peak suppression signal input from the transmission amplifier 530 while the output stop signal is input from the signal quality estimation unit 570, and outputs the peak suppression signal to the antenna 560 when the output stop signal is no longer input.

The signal quality estimation unit 570 carries out the process in accordance with an algorithm shown in the flow charts of FIG. 16, 17 or 19, executing the above-mentioned function.

Sixth Embodiment

The sixth embodiment is configured to determine a threshold value to be set for the peak suppression unit 3 by using an Adjacent Channel Leakage Ratio (ACLR). The ACLR is often used for specifying a spectrum characteristic of a signal.

Figure 25:
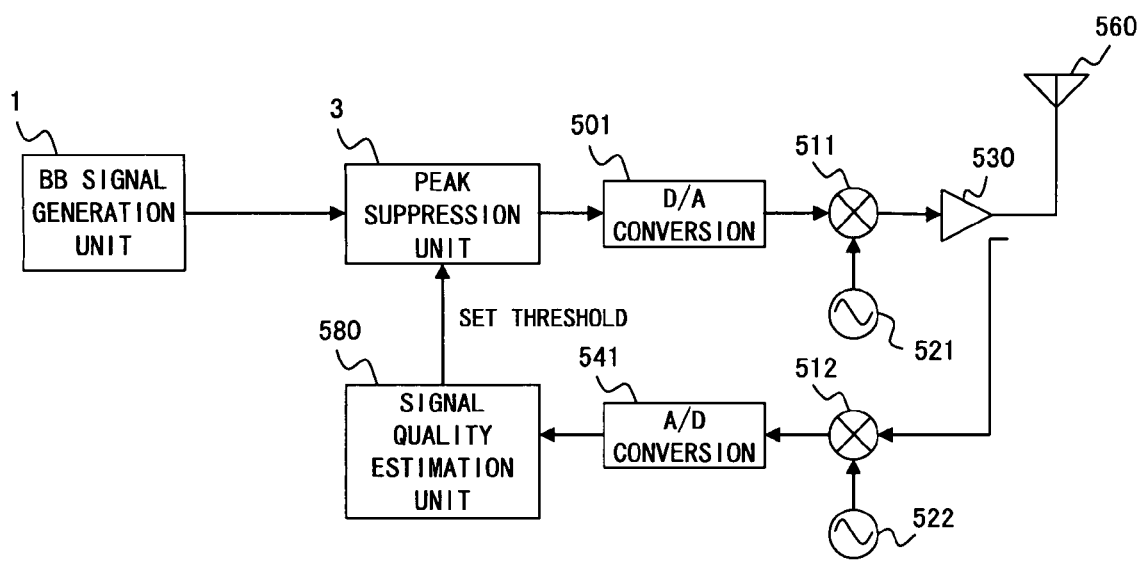
FIG. 25 is a block diagram showing a circuit configuration of a sixth embodiment of the present invention.

FIG. 25 is a block diagram showing a circuit configuration of the sixth embodiment. The same component sign is assigned to the same constituent component as that of FIG. 23 in the showing of FIG. 25.

The configuration difference between the sixth and fourth embodiment lies in only the configuration of signal quality estimation units. The signal quality estimation unit 580 of the sixth embodiment calculates an ACLR based on a second analog baseband signal input from the A/D converter 541 and determines a threshold value based on the value of the ACLR. The algorithm of determining the threshold value is as shown in the flow chart of FIG. 16, 17 or 19, and an ACLR is estimated as a signal quality in the process step of "signal quality estimation" of the flow chart.

FIG. 26 is a block diagram showing a configuration of an ACLR estimation process unit equipped within the signal quality estimation unit 580. The ACLR estimation process unit 600 shown by FIG. 26 comprises an FFT calculation unit 610 and an ACLR calculation unit 620. The ACLR calculation unit 620 comprises an in-signal band power integration unit 621, a divider 622, an interference band power integration unit 623 and a multiplier 624.

The FFT calculation unit 610 applies a fast Fourier transform to the peak suppression signal (i.e., a signal in a baseband band) output from the A/D converter 541 shown in FIG. 25 and obtains a spectrum of the peak suppression signal. The calculation result (i.e., a spectrum) of the FFT calculation unit 610 is output to the in-signal band power integration unit 621 and interference band power integration unit 623. The in-signal band power integration unit 621 integrates a power within a signal band of the peak suppression signal, and outputs the integration result (i.e., the in-signal band power) to the divider 622. The divider 622 calculates an inverse of the in-signal band power and outputs the inverse to the multiplier 624. The interference band power integration unit 623 inputs the calculation result of the FFT calculation unit 610 and calculates an interference band power of the peak suppression signal based on the input. The multiplier 624 multiplies the output of the divider 622 (i.e., the inverse of the in-signal band power) by the output (i.e., the interference band power) of the interference band power integration unit 623, and outputs the multiplication result as an ACLR estimation value.

FIG. 27 is a diagram showing a calculation result (i.e., a spectrum) of the FFT calculation unit 610. The horizontal axis is frequencies of a peak suppression signal and the vertical axis is power, in FIG. 27.

The in-signal band power Ps of a peak suppression signal is an integration value of power spectra distributed in a signal bandwidth Ws. The interference band power Pd is an integral number of power spectra distributed in an interference bandwidth Wd. Note that the signal bandwidth Ws is a prescribed bandwidth a center of which is a frequency fs of the peak suppression signal. And the interference bandwidth Wd is a prescribed bandwidth the center of which is a frequency fd (=fs+kf0) of an adjacent channel. The difference (i.e., detuning) between the frequency fs and frequency fd is designated by system.

The present embodiment defines ACLR=Pd/Ps, and the ACLR calculation unit 620 calculates a value of the ACLR. That is, the in-signal band power integration unit 621 calculates an in-signal band power Ps based on the spectrum calculated by the FFT calculation unit 610. Then the divider 622 calculates 1/Ps. The interference band power integration unit 623 calculates an interference band power Pd based on the spectrum calculated by the FFT calculation unit 610. Then, the multiplier 624 calculates an ACLR (i.e., an ACLR estimation value) based on the calculation results of the multiplier 624 and interference band power integration unit 623.

Seventh Embodiment

The seventh embodiment is an application of the present invention to a multi-carrier signal represented by the OFDM. The multi-carrier signal uses a plurality of carriers for transmission, sometimes requiring different signal quality requirements for each carrier. As an example, modulation systems can possibly be different for each user in an Orthogonal Frequency Division Multiple Access (OFDMA) method that assigns OFDM carriers (i.e., sub-carriers) to different users, differentiating a permissible degree of peak suppression for individual users.

In such a case, it would be best if different degree of peak suppression could be set for each carrier; it is, however, difficult to suppress before a multi-carrier synthesis because many of the peak components are generated by the multi-carrier synthesis. Accordingly, the present embodiment is configured to compare a plurality of required quality and determine a peak suppression threshold value so as to make the highest quality.

FIG. 28 is a block diagram showing a configuration of a circuit determining a peak suppression threshold value according to the seventh embodiment.

The peak suppression threshold value determination circuit 700 comprises a highest quality selection unit 710 and a threshold value determination unit 720. The highest quality selection unit 710 receives inputs of an n pieces of quality requirement information (i.e., quality requirement information 1, quality requirement information 2 through quality requirement information n), selects the highest quality requirement from among them and outputs the highest quality requirement to the threshold value determination unit 720.

A configuration of the threshold value determination unit 720 can adopt the peak suppression threshold value control unit 2 of FIG. 8, the quality information estimation unit 40 of FIG. 11, the signal quality estimation unit 110 of FIG. 15, the signal quality estimation unit 130 of FIG. 18, the signal quality estimation unit 550 of FIG. 23, the signal quality estimation unit 570 of FIG. 24 or the signal quality estimation unit 580 of FIG. 25.

{First Configuration Example of the Highest Quality Selection Unit 710}

Now a description is on a configuration example of the highest quality selection unit 710 in the case of inputting a "numerical value that indicates quality" as quality requirement information 1 through n. In this case, the highest quality selection unit 710 is configured similar to the peak suppression threshold value control unit 2 of FIG. 8.

FIG. 29 is a diagram showing a structure of a table comprised within the best quality selection unit 710 according to the present embodiment.

A record of the table 711 shown in FIG. 29 has three items, i.e., "Q(n)", "modulation method" and "coding ratio". The Q(n) is equivalent to the quality requirement information 1 through n and is a numerical value that indicates quality of a signal modulated by the "modulation method" and "coding ratio" and that is stored in the same record. Larger the numeral of Q(n), the higher the quality. The table 711 is configured as n=7, that is, to store seven items of records, with these records being stored in the ascending order of Q(n). The "modulation method" is a modulation method when generating a baseband signal. The table 711 stores three kinds of modulation methods, i.e., QPSK, 16QAM and 64QAM; with the records of the entries 1 and 2 registering the QPSK, those of the entries 3 and 4 registering the 16QAM and those of the entries 5 through 7 registering the 64QAM. The "coding ratio" is a value of the coding ratio of the modulation method registered in the same record. As an example, the coding ratio of the modulation method registered in the third record is 1/2. Note that the table 711 registers records in the ascending order of Q(n); it is, however, arbitrary. Records may be registered in a random order of Q(n). That is, records of the table may be stored freely.

Figure 30:
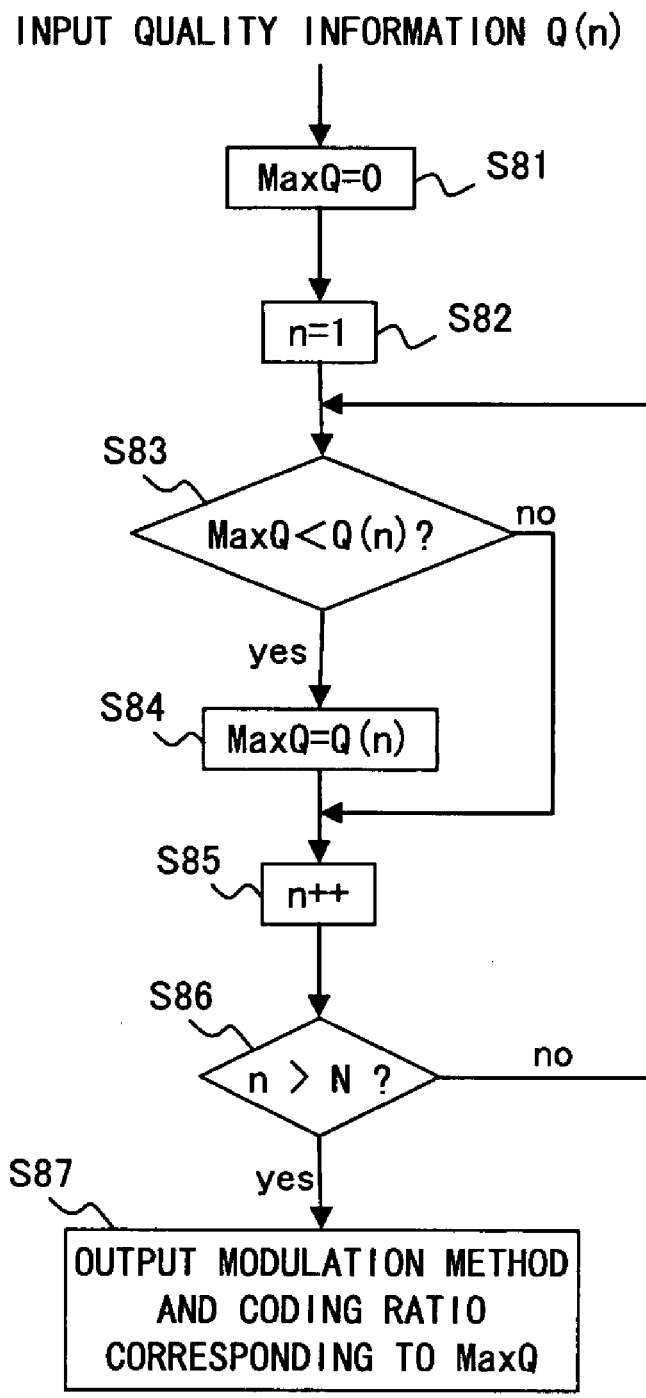
FIG. 30 is a flow chart showing a process of the highest quality selection unit comprising the table shown in FIG. 29.

FIG. 30 is a flow chart showing a process of the best quality selection unit 710 comprising the table 711.

Having been input an N piece of quality information Q (n), the best quality selection unit 710 initializes MaxQ to "0" (S81), followed by initializing a variable n to "1" (S82). It then judges whether MaxQ<Q(n) or not (S83) and, if MaxQ<Q(n), shifts the process to the step S84, otherwise shifts to the step S85.

It then substitutes Q(n) for MaxQ in the step S84 and shifts to the step S85. It then increments a value of n by only "1" followed by judging whether n>N or not (S86). The N is the number of pieces of quality information Q(n) to be input to the best quality selection unit 710. If not n>N in the judgment of the step S86, the process returns to the step S83, while if n>N, the process shifts to the step S87.

As such, the process of the steps S83 through S86 is repeated for the entirety of the input quality information Q(n), obtains a largest number among those pieces quality information Q(n) and sets the number for MaxQ.

If n>N in the judgment of the step S86, the process shifts to the step S87. The best quality selection unit 710 searches in the table 711 and outputs the "modulation method" and "coding ratio" registered in a record in which a Q(n) of the same value as MaxQ is set in the step S87.

The threshold value determination unit 720, comprising a table similarly structured as the table 21 of FIG. 9, obtains a threshold value corresponding to the "modulation method" and "coding ratio" that are input from the best quality selection unit 710 by referring to the table, and outputs the threshold value to the peak suppression unit 3.

{Second Configuration Example of the Highest Quality Selection Unit 710}

The next is a description of a configuration example of the highest quality selection unit 710 in the case of inputting BER, EVM, power difference or ACLR as quality requirement information 1 through n.

FIG. 31 is a flow chart showing an operation of the highest quality selection unit 710 of the present configuration. The assumption here is that BER, EVM, power difference or ACLR is input as quality requirement information Q(n) to the highest quality selection unit 710. Here, n=1 through N.

The highest quality selection unit 710 sets (infinity) for MinQ as initial value (S91), and sets "1" for variable n as initial value (S92).

Then it judges whether MinQ>Q(n) or not (S93), and if judged as MinQ>Q(n), shifts the process to the step S94, otherwise shifts to the step S95.

It then substitute a value of Q(n) for MinQ in the step S94, followed by shifting to the step S95. A value of n is incremented by only "1" in the step S95. It then judges whether n>N or not (S96) and, if not n>N, returns to the step S93.

As such, the processes of the steps S93 through S96 are repeated until the judgment is n>N in the step S96. Upon judging as n>N in the step S96, it outputs MinQ to the threshold value determination unit 720 (S97).

The repetition process of the steps S93 through S96 eventually sets the maximum value within the Q(1) through Q(N), that is, the value of the highest quality for MinQ, followed by the MinQ being output to the threshold value determination unit 720 in the step S97.

MODIFICATION EXAMPLE

The configuration of the present invention is not limited to the embodiments put forth in this specification. Neither is the signal quality information limited to what is presented herein.

What is claimed is:

1. A peak suppression degree control apparatus controlling a degree of peak suppression of a peak suppression unit, of a transmission amplifier, for suppressing a peak power of an input signal, comprising:
   a peak suppression degree control unit for controlling a degree of peak suppression of the peak suppression unit based on quality requirement information of a transmission signal which is suppressed by the peak suppression unit and is a baseband signal, wherein the quality requirement information includes at least a modulation method of the baseband signal; and
   a quality information estimation unit for estimating said required quality from a transmission signal suppressed by said peak suppression unit and determining said degree of peak suppression based on the estimated required quality, wherein
   said peak suppression degree control unit changes a degree of peak suppression of the peak suppression unit based on said quality requirement information obtained from the quality information estimation unit.

2. The peak suppression degree control apparatus according to claim 1, further comprising
   a demodulation unit for demodulating said baseband signal to a signal allowing an estimation of quality information, wherein
   said quality information estimation unit estimates a required quality of a demodulated signal based on the demodulated signal obtained by the demodulation unit.

3. The peak suppression degree control apparatus according to claim 2, wherein
   said quality information estimation unit comprises
   a constellation obtainment unit for obtaining a constellation of said demodulation signals,
   a modulation method estimation unit for estimating a modulation method of said baseband signal based on a constellation obtained by the constellation obtainment unit, and
   a peak suppression degree determination unit for determining a degree of peak suppression to be set in said peak suppression unit based on a modulation method obtained by the modulation system.

4. A peak suppression degree control apparatus controlling a degree of peak suppression of a peak suppression unit, of a transmission amplifier, for suppressing a peak power of an input signal, comprising:
   a signal quality estimation unit for estimating a signal quality of a peak suppression signal based on a transmission signal suppressed by the peak suppression unit and a peak suppression signal as a result of the peak suppression unit applying a peak suppression process to the transmission signal, and determining as a degree of peak suppression to be set in the peak suppression unit a degree of peak suppression signal of which signal quality is equal to or better than a predetermined quality by gradually increasing said degree of peak suppression from a predetermined minimum value.

5. The peak suppression degree control apparatus according to claim 4, further comprising:
   an output stop unit for stopping an external output of said peak suppression signal output from said peak suppression unit while an output stop signal is input from said signal quality estimation unit, wherein
   the signal quality estimation unit outputs the output stop signal to the output stop unit if it judges that a signal quality of the peak suppression signal does not meet a required quality.

6. A peak suppression degree control apparatus controlling a degree of peak suppression of a peak suppression unit, of a transmission amplifier, for suppressing a peak power of an input signal, comprising:
   a signal quality estimation unit for estimating a signal quality of a peak suppression signal based on a transmission signal suppressed by the peak suppression unit and a peak suppression signal as a result of the peak suppression unit applying a peak suppression process to the transmission signal, and controlling a degree of peak suppression to be set in the peak suppression unit so as to minimize said degree of peak suppression which satisfies a predetermined quality by gradually decreasing said degree of peak suppression from a predetermined maximum value.

7. The peak suppression degree control apparatus according to claim 4, wherein
a signal quality of said peak suppression signal which is determined by said signal quality estimation unit is a quality related to a degradation of reception quality.

8. The peak suppression degree control apparatus according to claim 7, wherein
said signal quality is Bit Error Rate (BER).

9. The peak suppression degree control apparatus according to claim 8, wherein
said signal quality estimation unit comprises
a first demodulation unit for demodulating said transmission signal,
a second demodulation unit for demodulating said peak suppression signal,
a first decoding unit for decoding a signal demodulated by the first demodulation unit,
a second decoding unit for decoding a signal demodulated by the second demodulation unit, and
a BER calculation unit for calculating said BER based on a first decoded signal decoded by the first decoding unit and a second decoded signal decoded by the second decoding unit.

10. The peak suppression degree control apparatus according to claim 7, wherein
said signal quality is Error Vector Magnitude (EVM).

11. The peak suppression degree control apparatus according to claim 10, wherein
said signal quality estimation unit comprises
a first demodulation unit for demodulating said transmission signal,
a second demodulation unit for demodulating said peak suppression signal, and
an EVM calculation unit for calculating said EVM based on a first demodulated signal demodulated by the first demodulation unit and a second demodulated signal demodulated by the second demodulation unit.

12. A peak suppression degree control apparatus controlling a degree of peak suppression of a peak suppression unit, of a transmission amplifier, for suppressing a peak power of an input signal, comprising:
a signal quality estimation unit for estimating a signal quality of a peak suppression signal based on a transmission signal suppressed by the peak suppression unit and a peak suppression signal as a result of the peak suppression unit applying a peak suppression process to the transmission signal, and determining a degree of peak suppression to be set in the peak suppression unit so as to make the signal quality equal to or better than a predetermined quality,
wherein a signal quality of said peak suppression signal is a quality related to a degradation of reception quality and is a power attenuation of a signal resulting from peak suppression performed by said peak suppression unit; and
wherein said signal quality estimation unit comprises
a first power calculation unit for calculating a power of said transmission signal,
a second power calculation unit for calculating a power of said peak suppression signal, and
a power attenuation calculation unit for calculating said power attenuation of a signal based on a first power calculated by the first power calculation unit and a second power calculated by the second power calculation unit.

13. A peak suppression degree control apparatus controlling a degree of peak suppression of a peak suppression unit, of a transmission amplifier, for suppressing a peak power of an input signal, comprising:
a peak suppression degree control unit for controlling a degree of peak suppression of the peak suppression unit based on quality requirement information of a transmission signal which is suppressed by the peak suppression unit and is a baseband signal, wherein the quality requirement information includes at least a modulation method of the baseband signal; and
a signal quality estimation unit for estimating a signal quality of a signal output from said transmission amplifier based on said transmission signal and a signal as a result of modulating a carrier modulation signal of said peak suppression signal output from the transmission amplifier.

14. The peak suppression degree control apparatus according to claim 13, further comprising:
an output stop unit for stopping an external output of said peak suppression signal output from said peak suppression unit while an output stop signal is input from said signal quality estimation unit, wherein
the signal quality estimation unit outputs the output stop signal to the output stop unit if it judges that a signal quality of the peak suppression signal does not meet a required quality.

15. The peak suppression degree control apparatus according to claim 13, wherein
said signal quality estimation unit determines said degree of peak suppression a degree of peak suppression signal of which signal quality is equal to or better than a predetermined quality by gradually increasing said degree of peak suppression from a predetermined minimum value.

16. The peak suppression degree control apparatus according to claim 13, wherein
said signal quality estimation unit controls said degree of peak suppression so as to make the signal quality of the peak suppression signal always equal to or better than a predetermined quality, and sets so as to minimize said degree of peak suppression.

17. The peak suppression degree control apparatus according to claim 7, wherein
said signal quality is an Adjacent Channel Leakage Ratio (ACLR).

18. The peak suppression degree control apparatus according to claim 17, wherein
said signal quality estimation unit comprises
an FFT process unit for applying fast Fourier transform (FFT) to said peak suppression signal, and
an ACLR calculation unit for calculating ACLR based on a spectrum of the peak suppression signal obtained by the FFT process unit.

19. The peak suppression degree control apparatus according to claim 18, wherein
said ACLR calculation unit comprises
a in-signal band range power calculation unit for calculating a in-signal band range power of said peak suppression signal based on said spectrum, a interference band range power calculation unit for calculating a interference band range power of said peak suppression signal based on said spectrum, and a calculation unit for calculating an ACLR based on the in-signal band range power calculated by the in-signal band range power calculation unit and the interference band range power calculated by the within-interference band range power calculation unit.

20. A peak suppression degree control apparatus controlling a degree of peak suppression of a peak suppression unit, of a transmission amplifier, for suppressing a peak power of an input signal, comprising:

a peak suppression degree control unit for controlling a degree of peak suppression of the peak suppression unit based on quality requirement information of a multi-carrier transmission signal which is suppressed by the peak suppression unit and is a baseband signal, wherein the quality requirement information includes at least a modulation method of the baseband signal, wherein said peak suppression degree control unit changes said degree of peak suppression in accordance with a signal required of the strictest required quality among individual carrier signals of the multi-carrier signal.

21. The peak suppression degree control apparatus according to claim 20, wherein said peak suppression degree control unit comprises a highest-quality type selection unit for selecting the highest quality from among required qualities that are set in quality requirement information of individual carrier signal of said multi-carrier signal, and a peak suppression degree determination unit for determining said degree of peak suppression based on the highest quality selected by the highest-quality type selection unit.

22. The peak suppression degree control apparatus according to claim 20, wherein said quality requirement information is a modulation system and a coding ratio.

23. The peak suppression degree control apparatus according to claim 20, wherein said quality requirement information is information related to a degradation of reception quality of said peak suppression signal.

24. The peak suppression degree control apparatus according to claim 23, wherein said quality requirement information is Bit Error Rate (BER).

25. The peak suppression degree control apparatus according to claim 23, wherein said quality requirement information is an Error Vector Magnitude (EVM).

26. The peak suppression degree control apparatus according to claim 23, wherein said quality requirement information is a said signal quality is a power attenuation of a signal resulting from peak suppression performed by said peak suppression unit.

27. The peak suppression degree control apparatus according to claim 23, wherein said quality requirement information is an Adjacent Channel Leakage Ratio (ACLR).

28. A peak suppression degree control apparatus controlling a degree of peak suppression of a peak suppression means, of a transmission amplifier, for suppressing a peak power of an input signal, comprising:

peak suppression degree control means for controlling a degree of peak suppression of the peak suppression unit based on quality requirement information of a transmission signal which is suppressed by the peak suppression means and is a baseband signal, wherein the quality requirement information includes at least a modulation method of the baseband signal; and a quality information estimation means for estimating said required quality from a transmission signal suppressed by said peak suppression means and determining said degree of peak suppression based on the estimated required quality, wherein said peak suppression degree control means change a degree of peak suppression of the peak suppression means based on said quality requirement information obtained from the quality information estimation means.

29. A peak suppression degree control method for controlling a degree of peak suppression of a peak suppression unit, of a transmission amplifier, for suppressing a peak power of an input signal, comprising:

controlling by a peak suppression degree control unit a degree of peak suppression of the peak suppression unit based on quality requirement information of a transmission signal which is suppressed by the peak suppression unit and is a baseband signal, wherein the quality requirement information includes at least a modulation method of the baseband signal;

estimating by a quality information estimation unit said required quality from a transmission signal suppressed by said peak suppression unit and determining said degree of peak suppression based on the estimated required quality; and changing by said peak suppression degree control unit a degree of peak suppression of the peak suppression unit based on said quality requirement information obtained from the quality information estimation unit.

* * * * *